Sept. 8, 1970  C. A. STAMP  3,527,238
PAY MACHINE
Filed Feb. 6, 1968  29 Sheets-Sheet 2
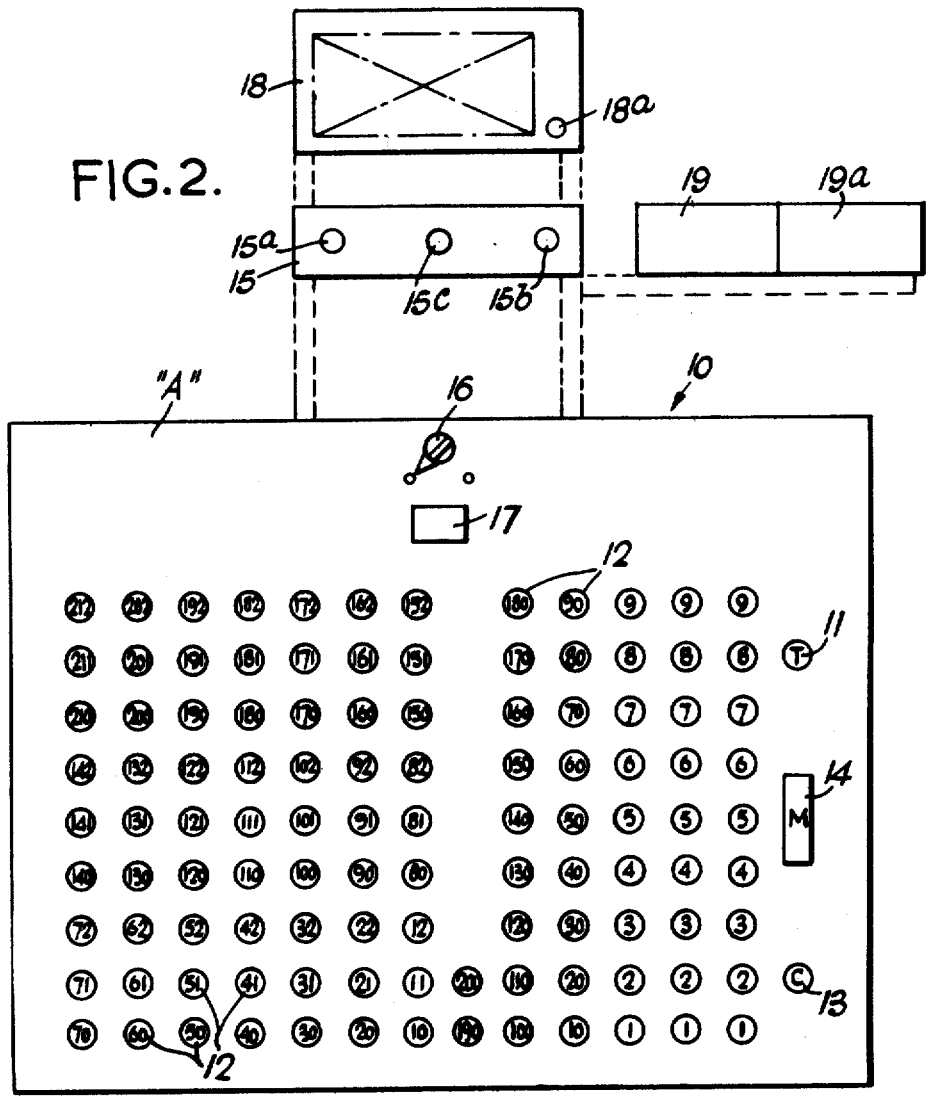
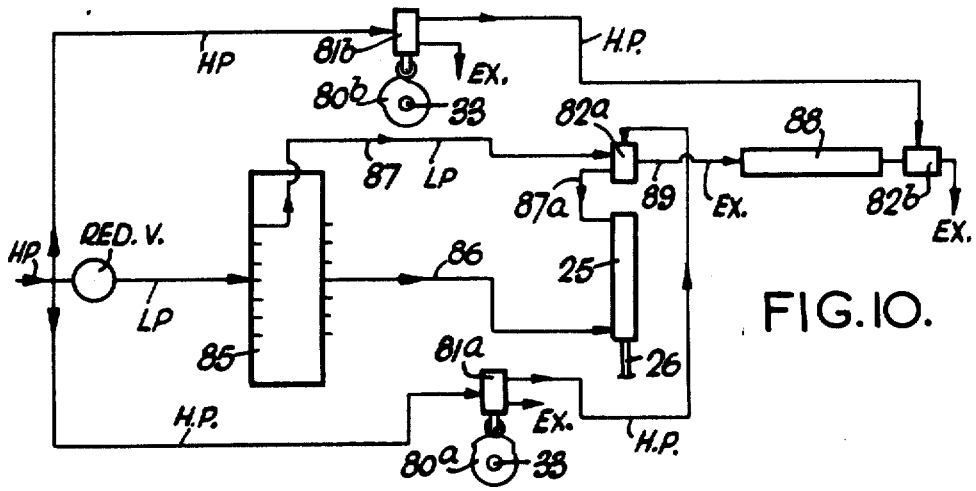

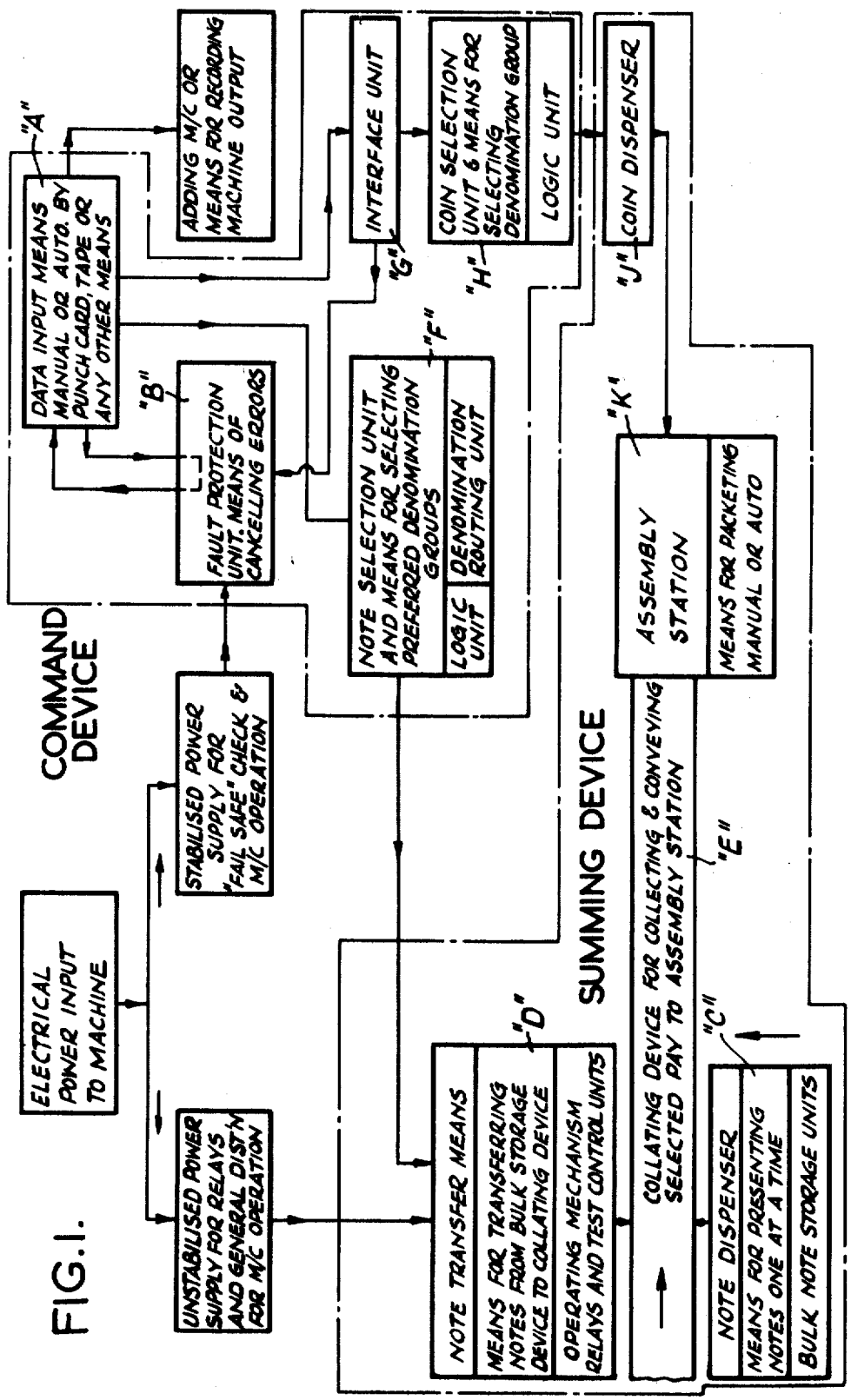

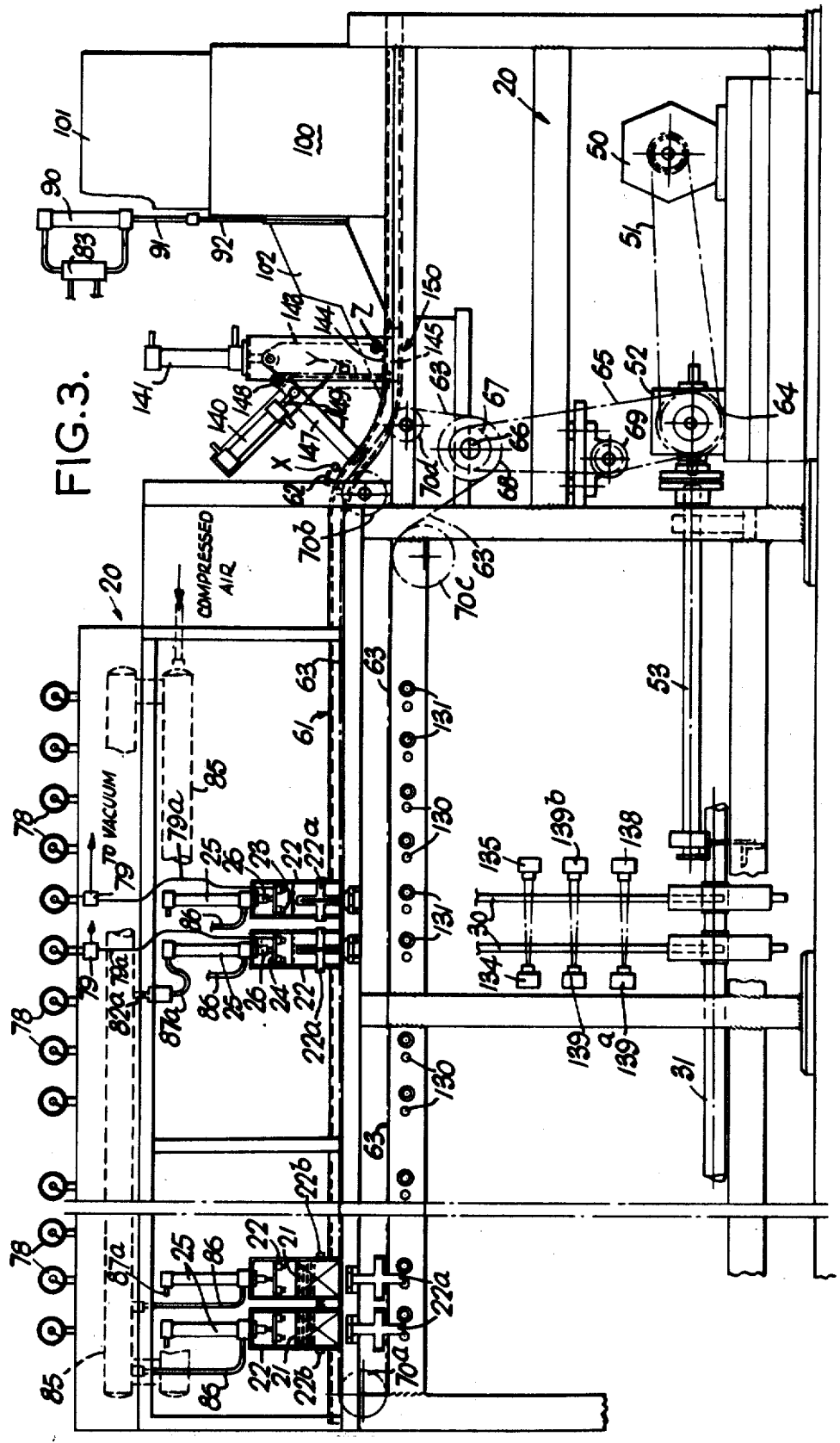

Sept. 8, 1970 C. A. STAMP 3,527,238
PAY MACHINE
Filed Feb. 6, 1968 29 Sheets-Sheet 4
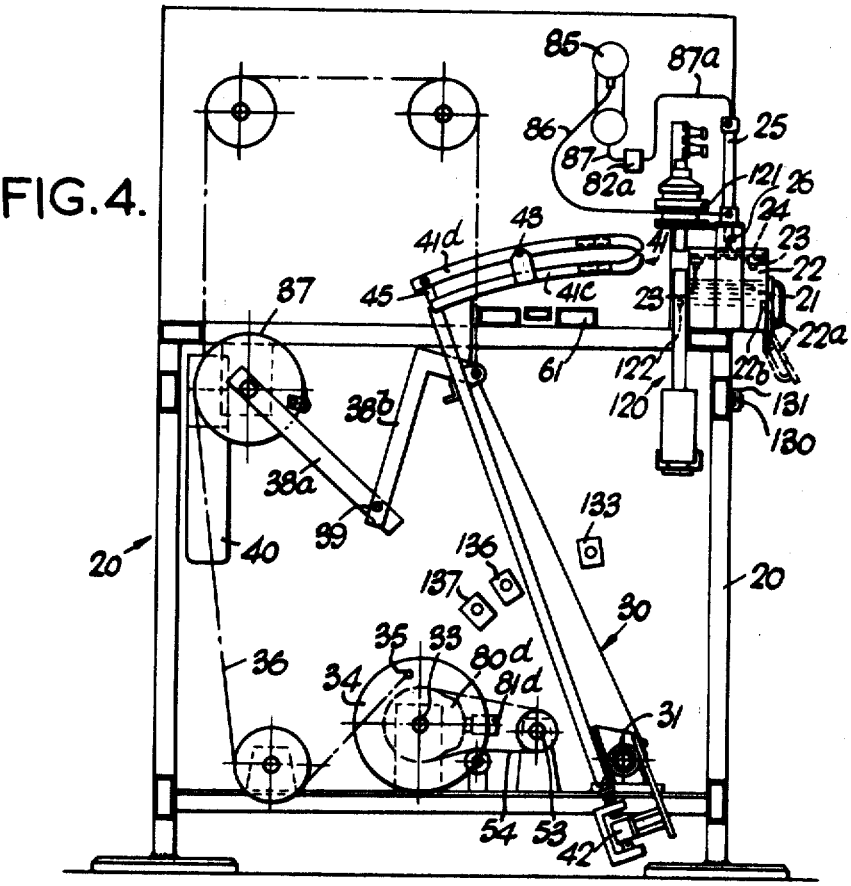
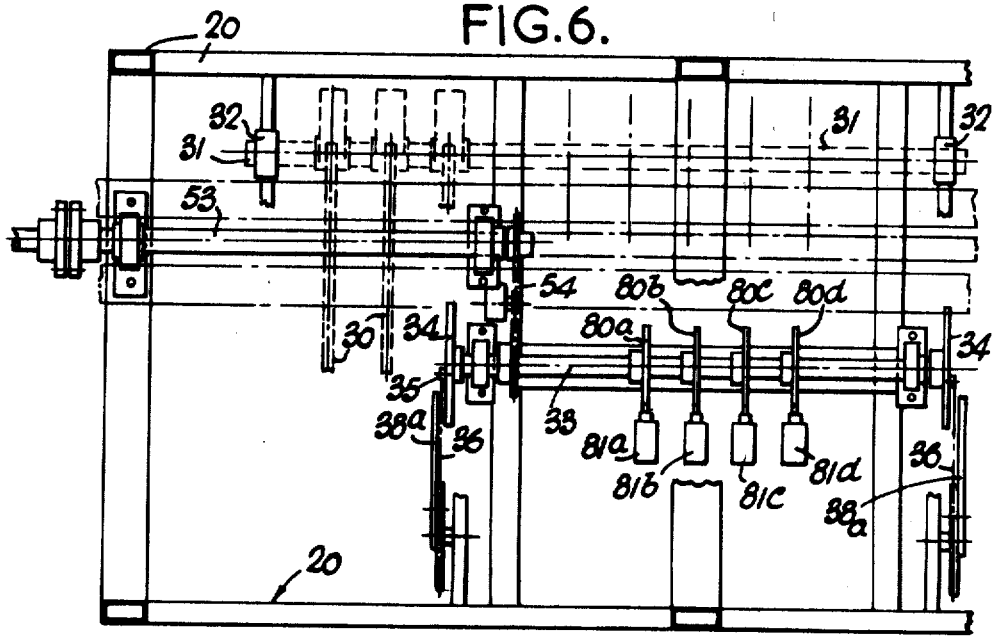

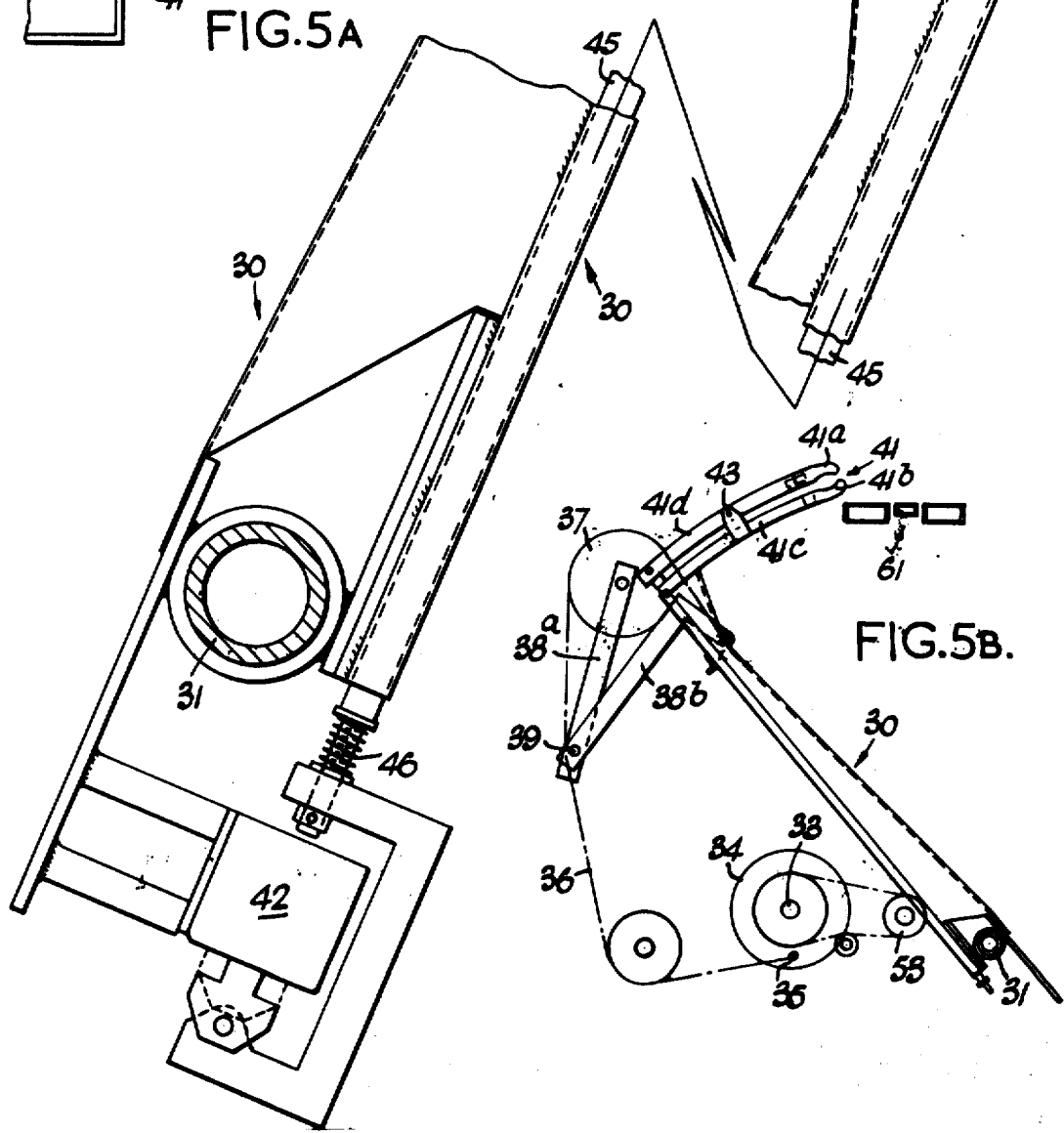

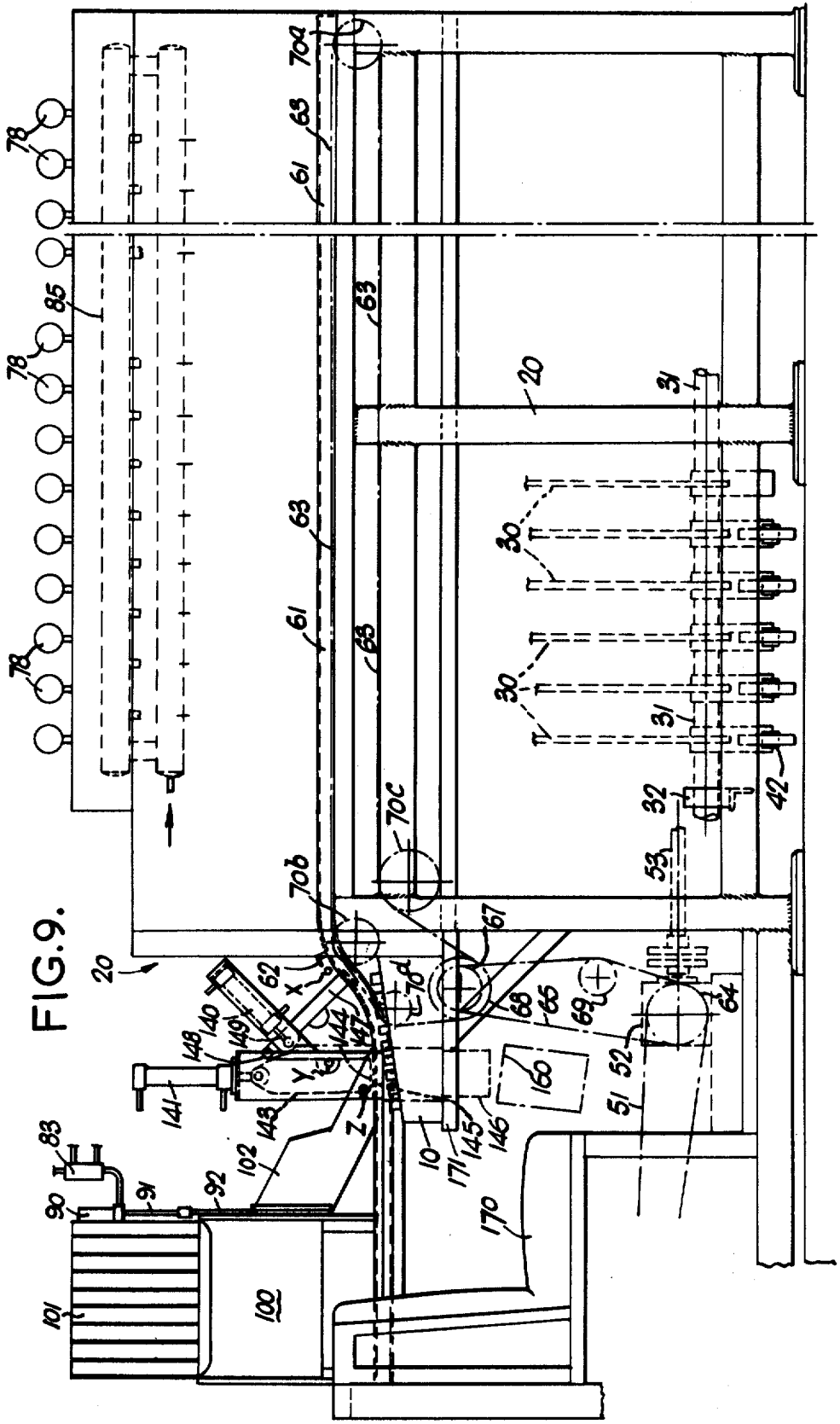

Sept. 8, 1970      C. A. STAMP      3,527,238

PAY MACHINE

Filed Feb. 6, 1968      29 Sheets-Sheet 8

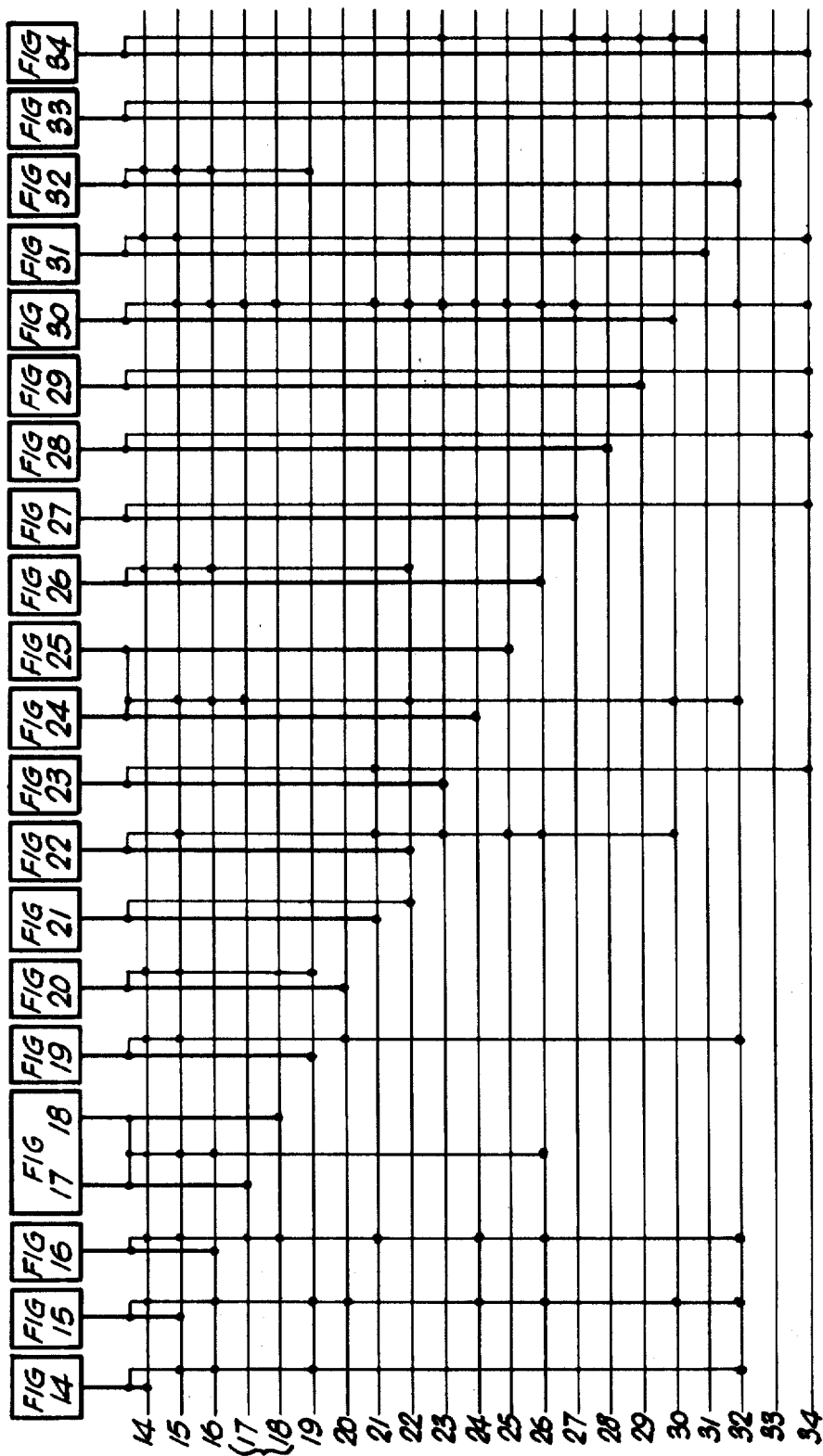
FIG. 13. BLOCK DIAGRAM SHOWING THE INTERRELATION OF THE ELECTRONIC SCHEMATICS

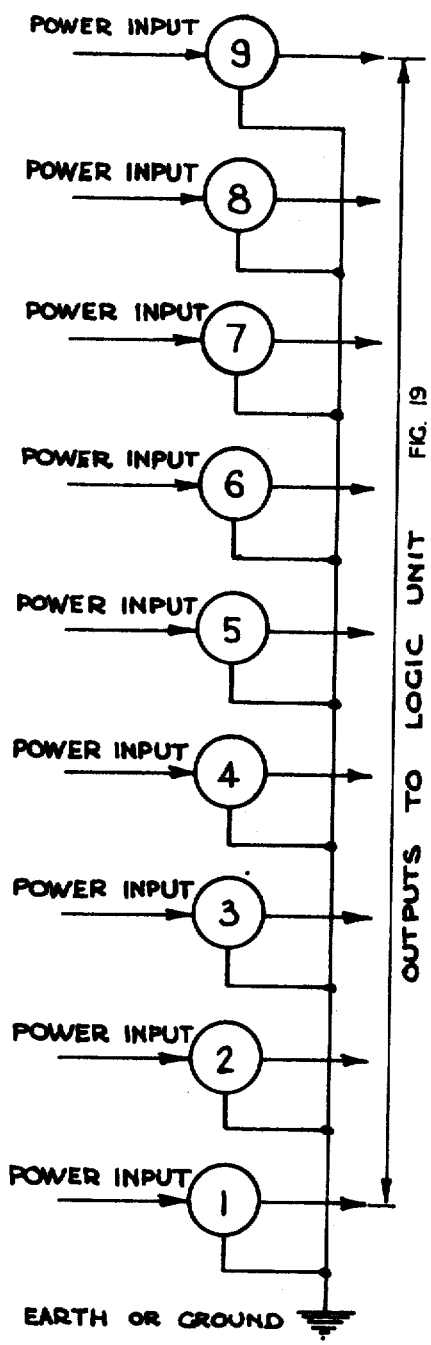
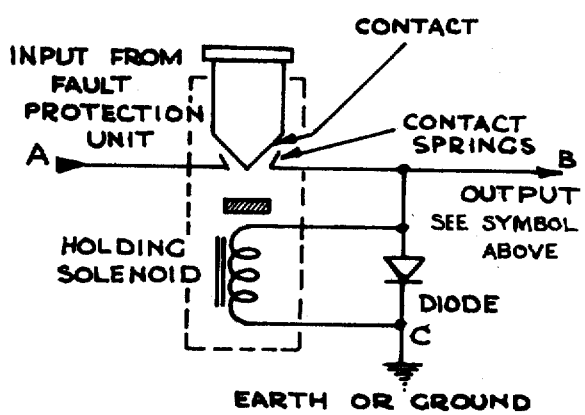
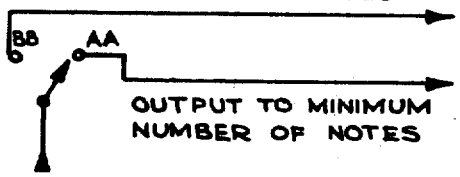
BUTTON KEY SCHEMATIC
FIG. 14B
SWITCH
FIG. 14C
CONTROL CONSOLE
FIG. 14
TYPICAL ARRANGEMENT – FIG 14 A
COLUMN OR GROUP OF BUTTON KEYS

FAULT PROTECTION UNIT

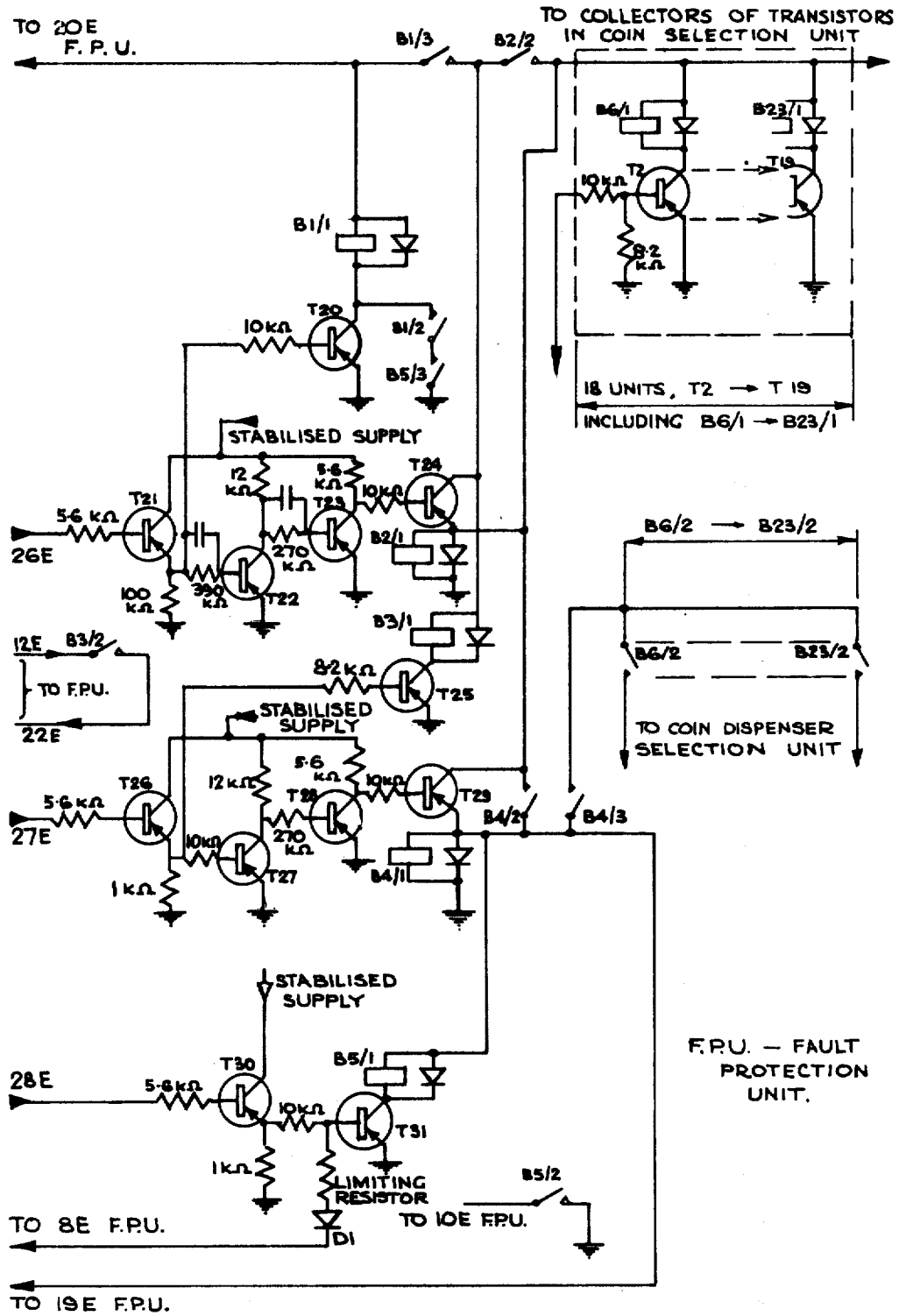
INTERFACE UNIT   FIG. 16.

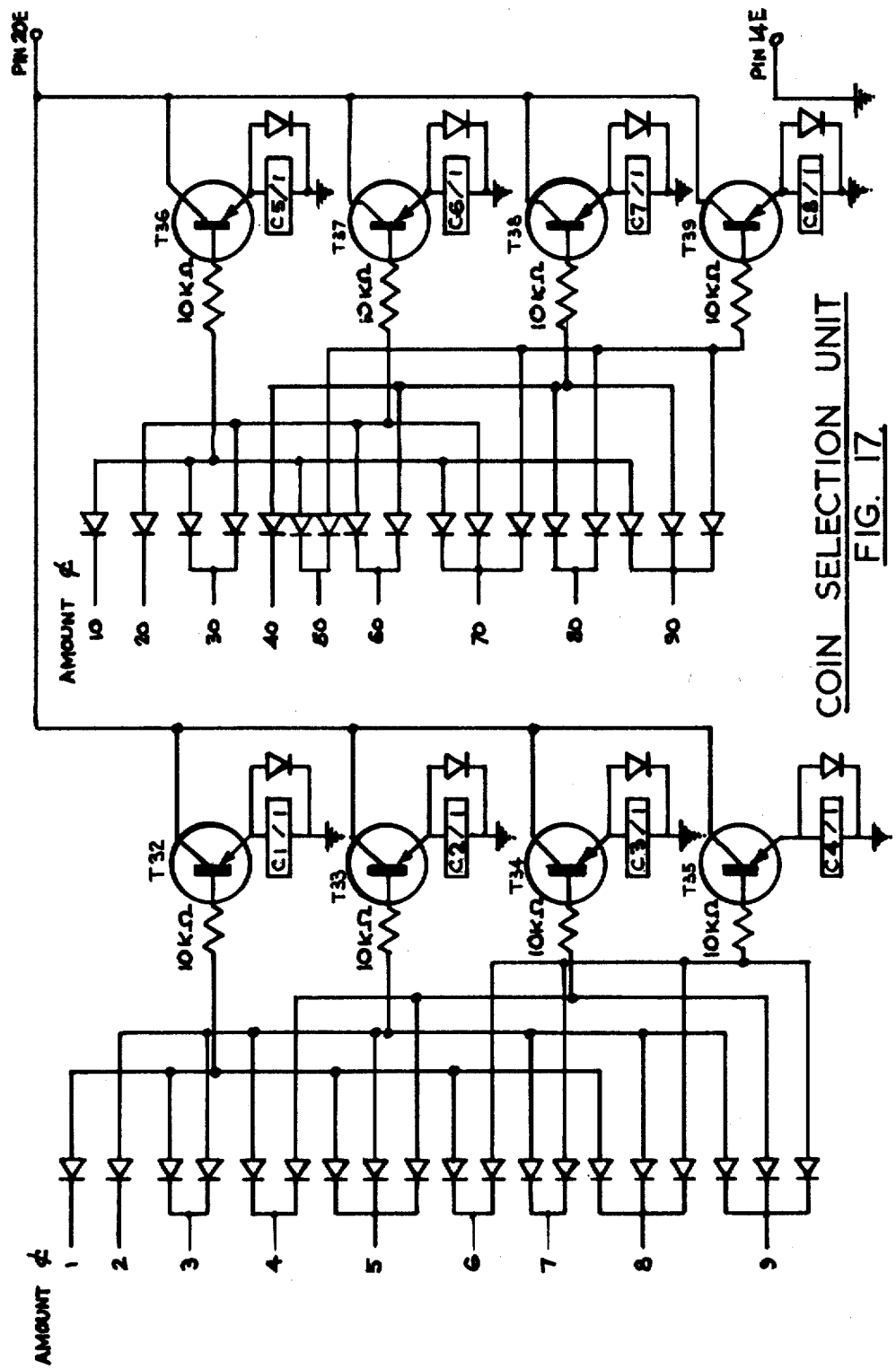

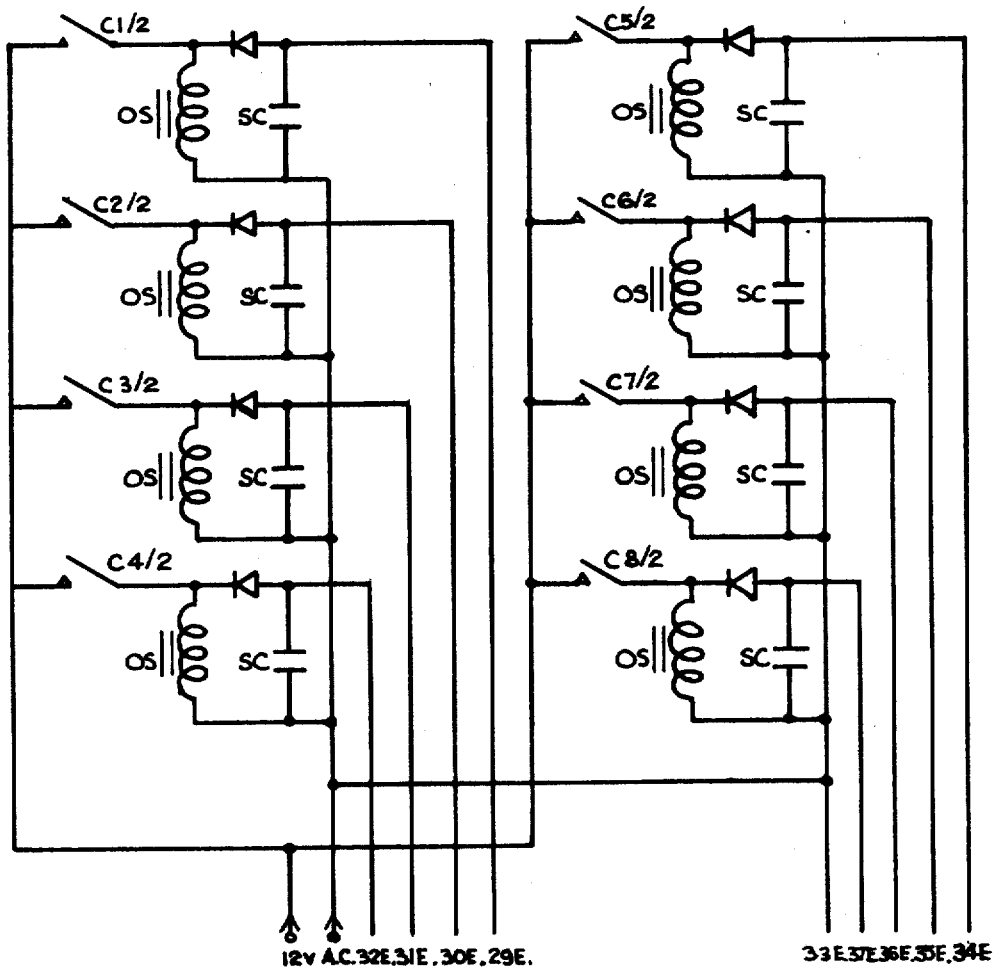
POINTS 29E TO 37E ARE COUNTER CONNECTIONS.
- 29E 1¢ COLUMN
- 30E 2¢ "
- 31E 2¢ "
- 32E 5¢ "
- 33E COMMON
- 34E 10¢ COLUMN
- 35E 20¢ "
- 36E 2×20¢ "
- 37E 2×20¢ "
INDICATES CONTACTS NORMALLY OPEN.
- OS OPERATING SOLENOID
- SC SMOOTHING CAPACITOR.
COIN SELECTION UNIT  FIG. 18.

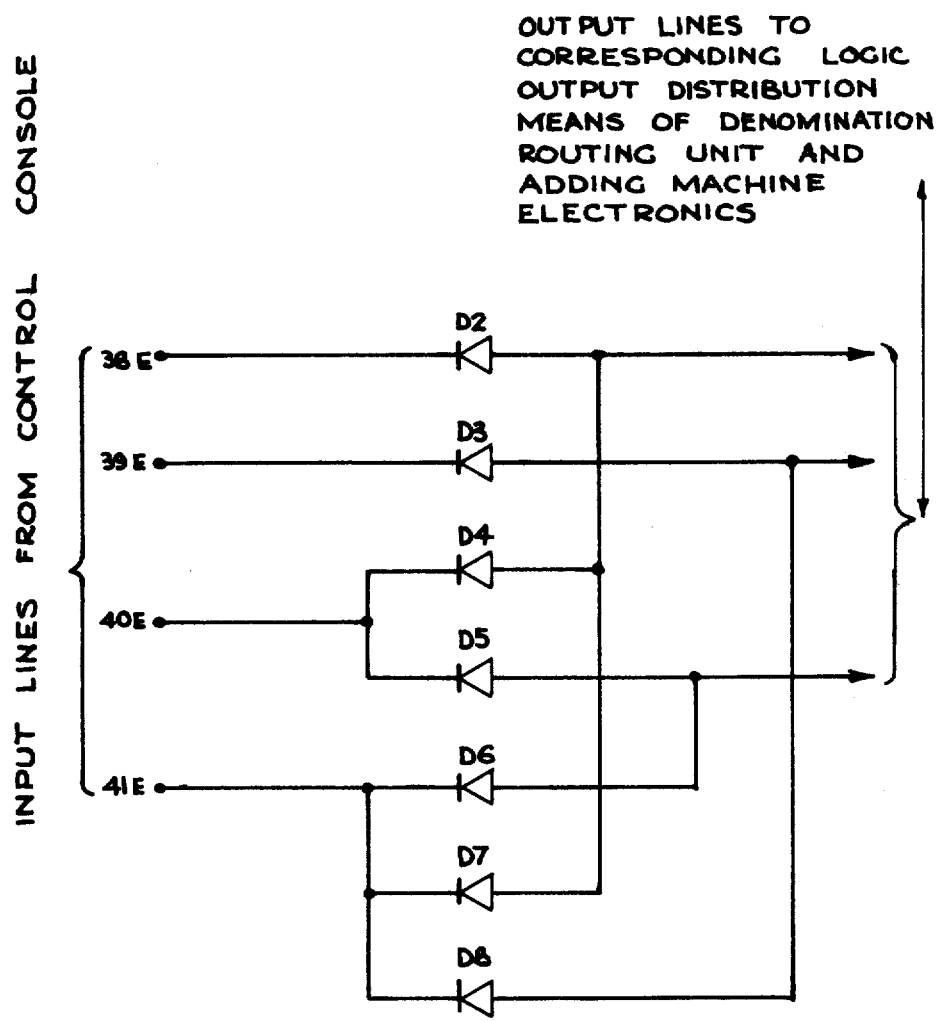

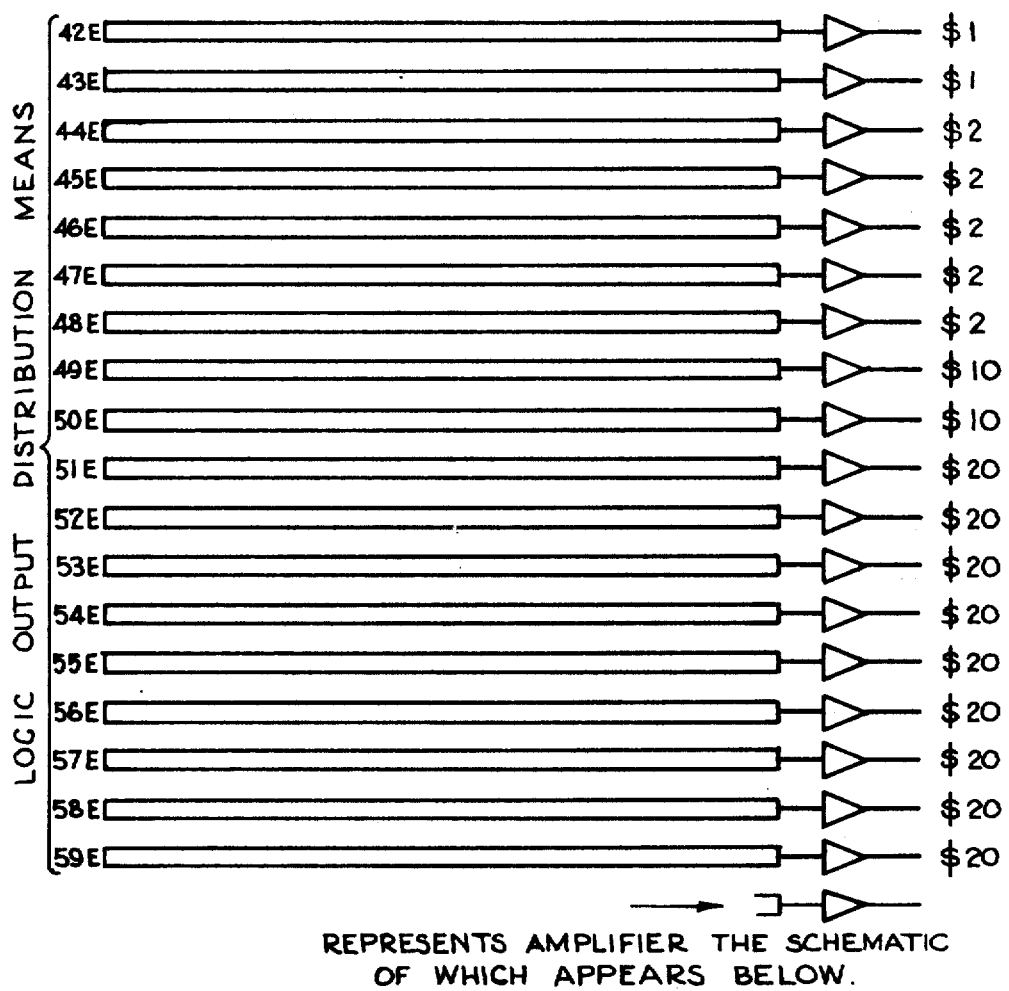
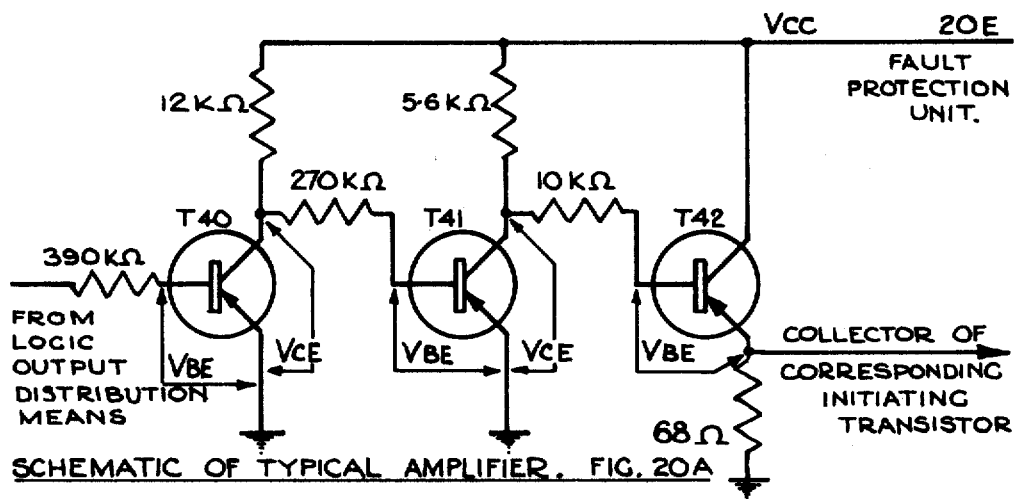
SCHEMATIC OF TYPICAL AMPLIFIER. FIG. 20A
DENOMINATION ROUTING UNIT. FIG. 20

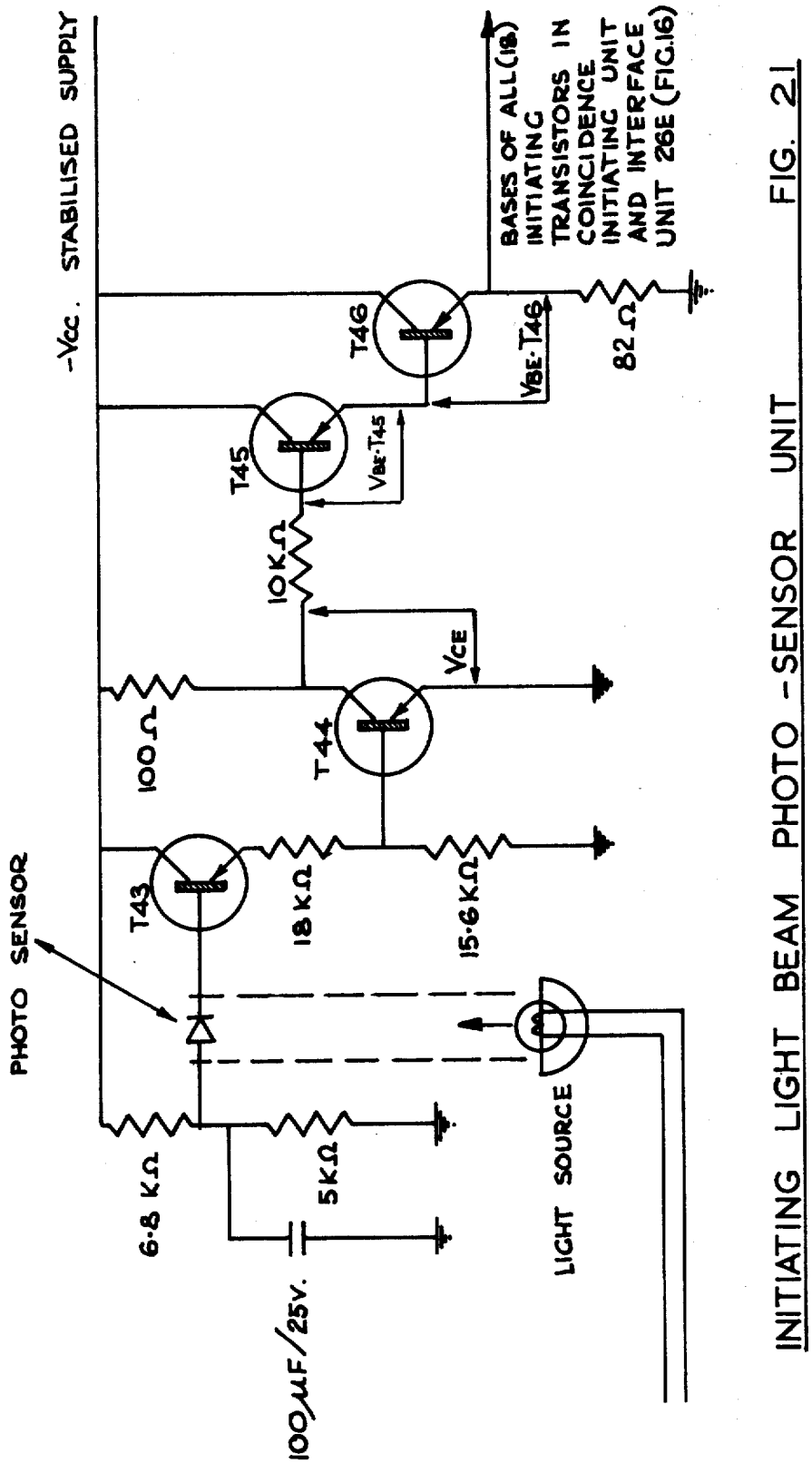

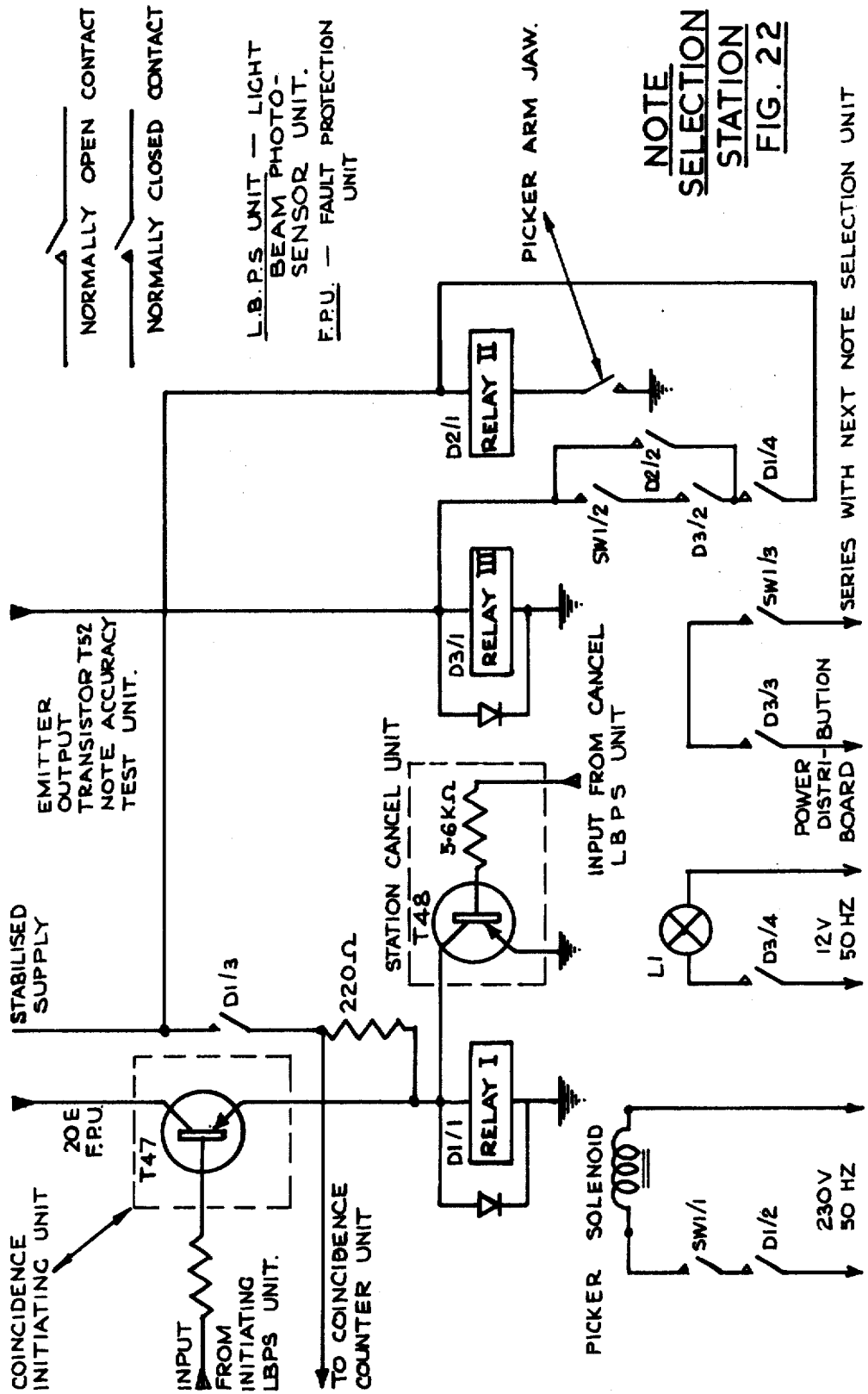

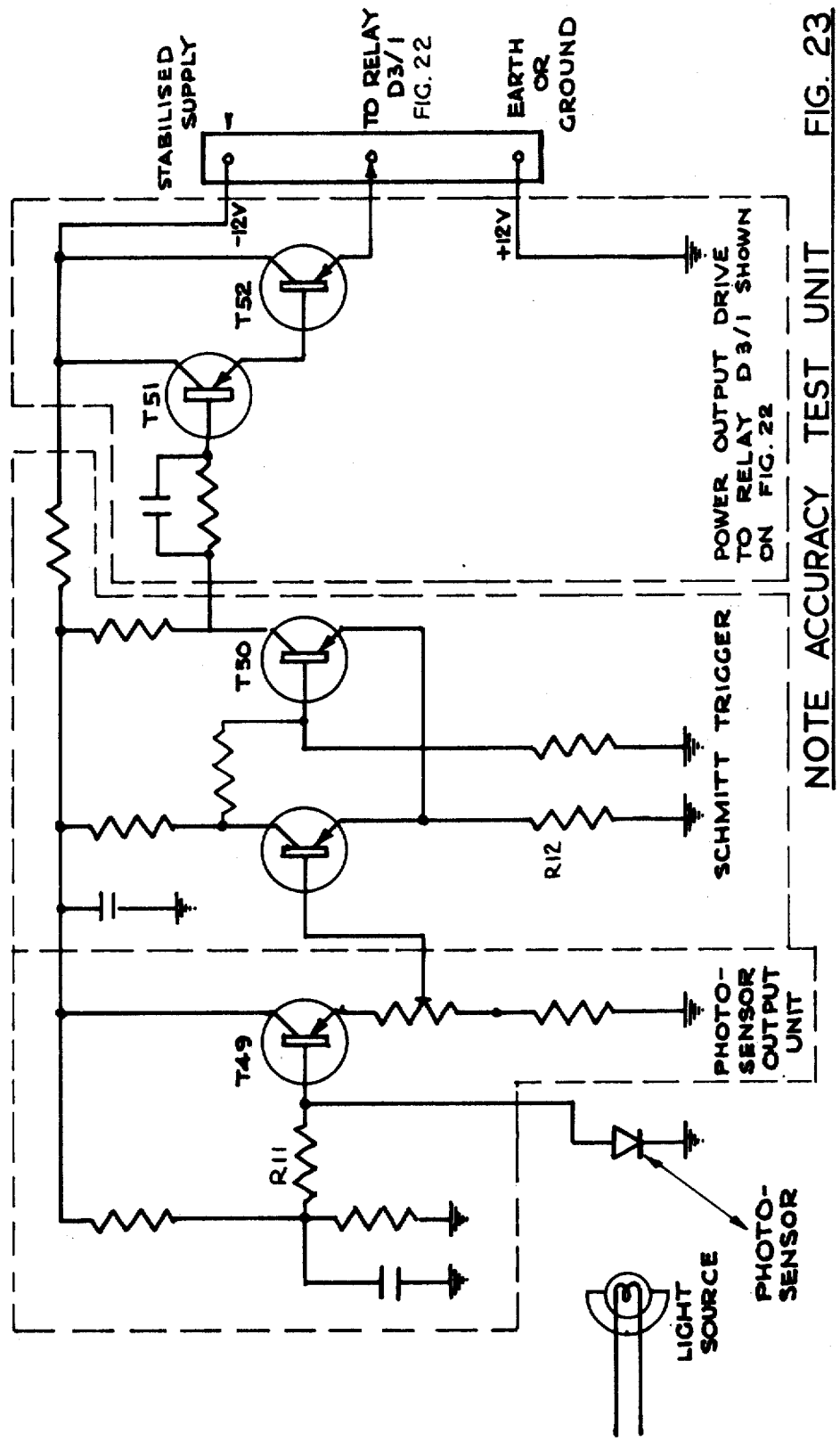

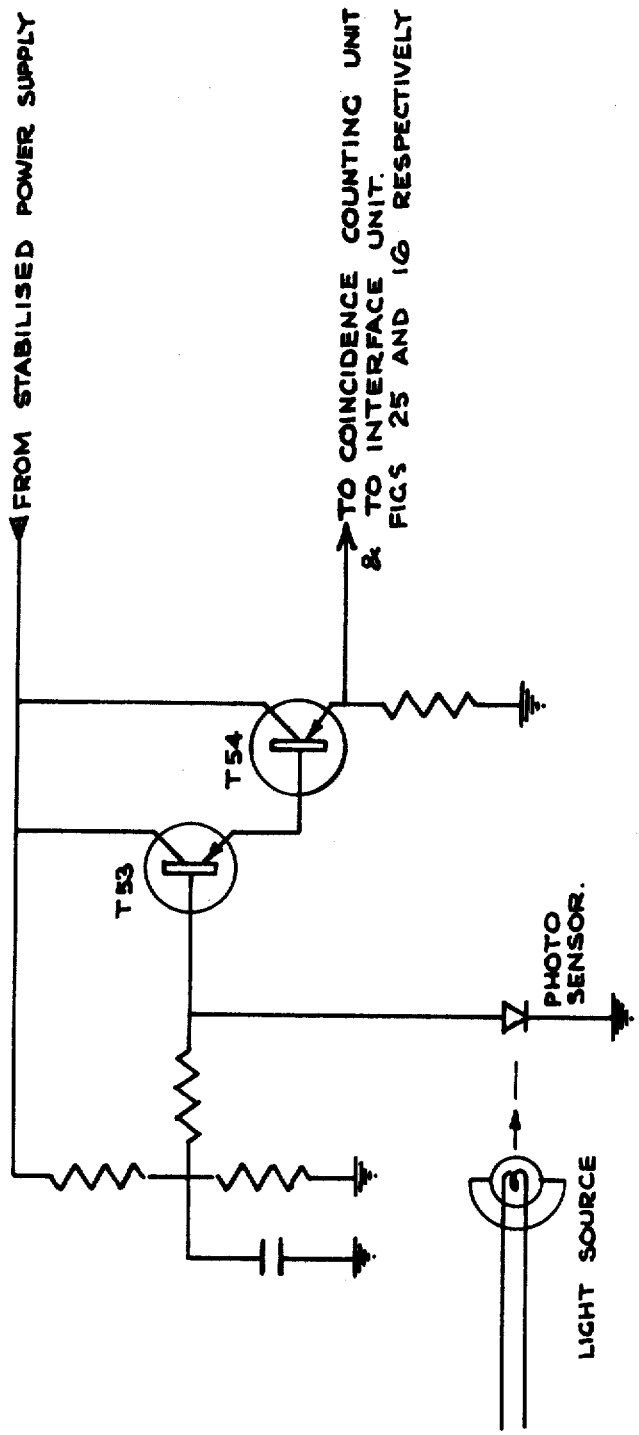

COINCIDENCE COUNTING UNIT

FIG. 26. CANCEL LIGHT BEAM PHOTO-SENSOR UNIT

DELAY TIMER   FIG. 28

CABINET INTERLOCKING SYSTEM

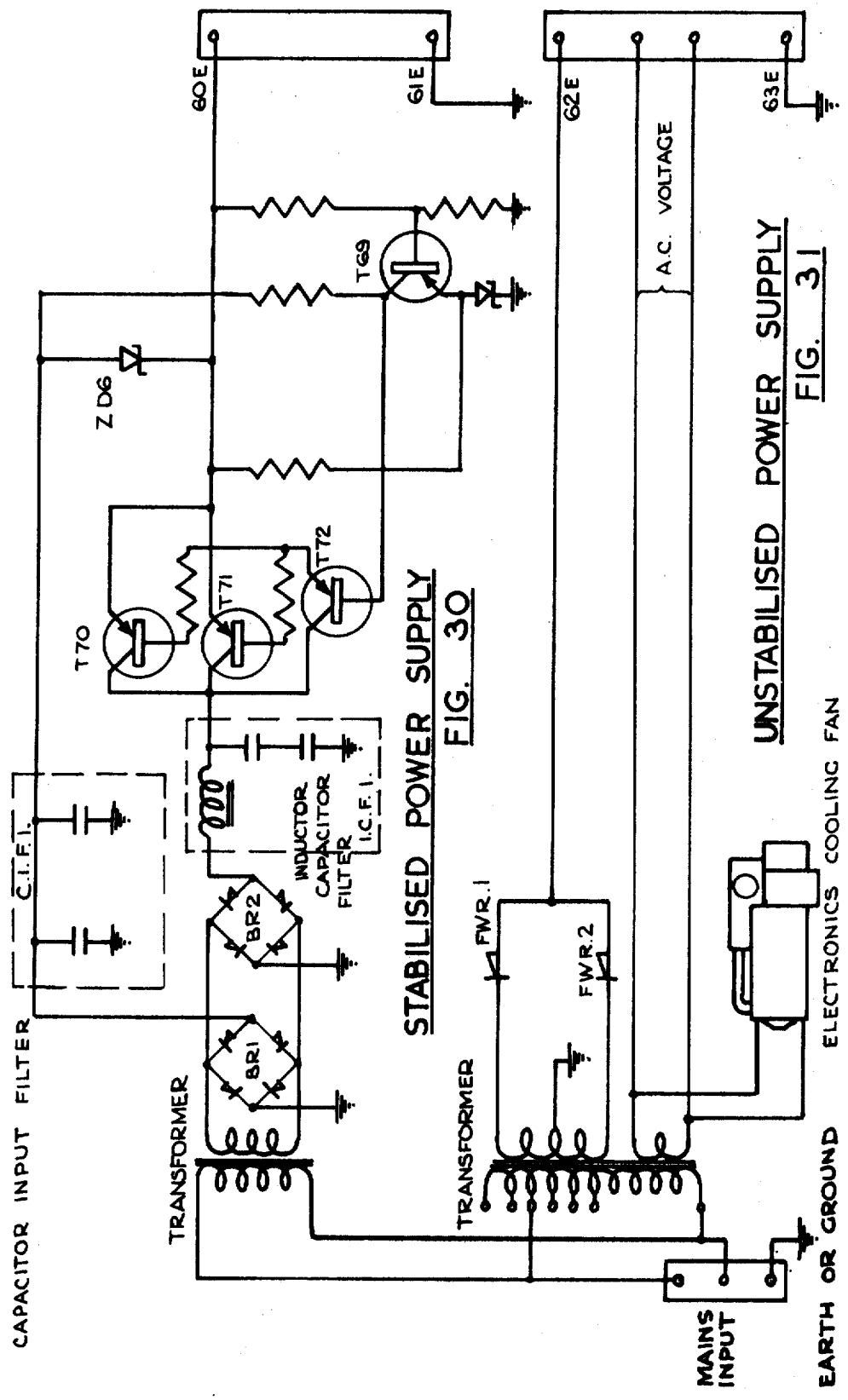

ADDING MACHINE OPERATING UNIT

Sept. 8, 1970  C. A. STAMP  3,527,238
PAY MACHINE
Filed Feb. 6, 1968  29 Sheets-Sheet 28

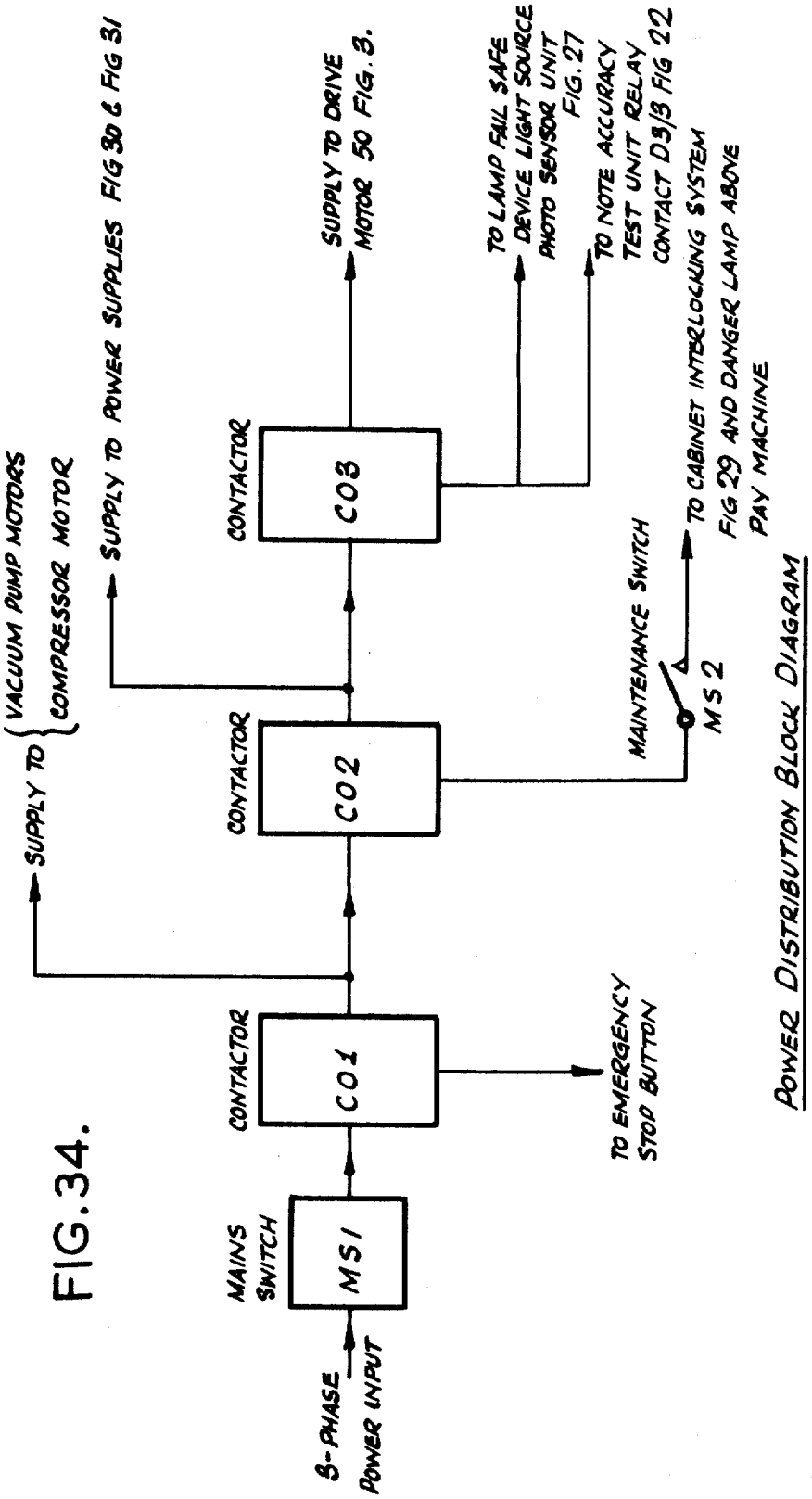

United States Patent Office 3,527,238
Patented Sept. 8, 1970

3,527,238
PAY MACHINE
Charles Alexander Stamp, Surrey Hills, Victoria, Australia, assignor to Mayne Nickless Limited, South Melbourne, Victoria, Australia
Filed Feb. 6, 1968, Ser. No. 703,339
Claims priority, application Australia, Feb. 8, 1967, 17,408/67
Int. Cl. G07d 1/00
U.S. Cl. 133—4                                    7 Claims

ABSTRACT OF THE DISCLOSURE

A money dispensing machine having a command means which includes a data input means and with a summing means which is connected to the command means. The data input means controls the command means to provide a signal to the summing means which is representative of a selection of monetary elements which are to be paid out. The summing means includes a note dispenser which has a plurality of note storage boxes, each of which stores the notes for a respective denomination. A note transfer means includes a picker arm for each note storage box, and these picker arms are selectively controlled in response to the signal to selected ones of the note storage boxes and transfer selected notes in accordance with the sum to be paid out. Each picker arm places the note which it has selected into a respective cradle, and a conveyor is also provided for periodically collating the notes stored in the cradle and delivering such notes to an assembly station.

---

This invention relates to pay machines and more particularly, but not exclusively, to a machine for paying out, by delivery to an assembly station, predetermined sums of money, such as salaries or wages, payable in notes and coins.

In broad terms, there is provided, according to the invention, a pay machine comprising a command device and a summing device responsive to the command device, said command device having data input means for receiving predetermined pay data and transferring said data to the summing device as the monetary sum to be paid out thereby; the summing device comprising a dispenser for presenting currency elements corresponding to the monetary sum to a transfer means, means responsive to said data input means for actuating said dispenser and operating said transfer means, and means for collecting the monetary sum dispensed and conveying it to an assembly station.

In a particular instance, the monetary sum may consist of monetary elements, such as notes and/or coins, when the summing device would comprise a note dispenser for presenting notes to a note transfer means, a coin dispenser for dispensing coins, means responsive to said data input means for actuating said coin dispenser and note dispenser and operating said transfer means, and means for collecting the monetary elements dispensed and conveying them to an assembly station.

A more specific example of the invention visualises a command device having data input means for receiving predetermined pay data and transferring said data to the summing device as a selection of monetary elements (notes and/or coins) constituting the sum to be paid out; the summing device comprising a note dispenser having note storage units, means for presenting notes one at a time from said units, and note transfer means comprising picker mechanism for picking out notes presented from the note storage units, a coin dispenser for dispensing coins from coin magazines, means responsive to said data input means for actuating said coin dispenser and note dispenser and operating said picker mechanism in accordance with the said selection, and means for collecting and conveying the selected notes and/or coins to an assembly station.

One practical arrangement of the invention will now be described with reference to the accompanying drawings in which:

FIG. 1 is a block diagram of the functional components of the machine according to the invention.

FIG. 2 is a plan view of the control console keyboard, and includes control panels and an adding machine shown diagrammatically.

FIG. 3 is a side elevation of the pay machine, some parts being broken away or omitted for clarity.

FIG. 4 is an end elevation of the machine, some parts being omitted for clarity.

FIG. 5 is a side elevation to an enlarged scale of a picker mechanism viewed from the opposite side of FIG. 4.

FIG. 5A is a detail in plan of a portion of FIG. 5.

FIG. 5B is a side elevation of a picker as shown in FIG. 4, but in the extreme withdrawn position.

FIG. 6 is a plan view of portion of the interior of the machine.

FIG. 9 is a side elevation of the machine similar to FIG. 3, but viewed from the opposite side.

FIG. 10 is a diagram of the air circuitry of the cam-operated poppet valves and the 3-port valves in the pneumatic system correlating the note dispenser and the note transfer means.

FIG. 13 is a block diagram showing the interrelation of the electronic schematics according to the following figures.

FIG. 14 comprising FIGS. 14A, 14B and 14C is a schematic of the control console with details.

Figure 15:
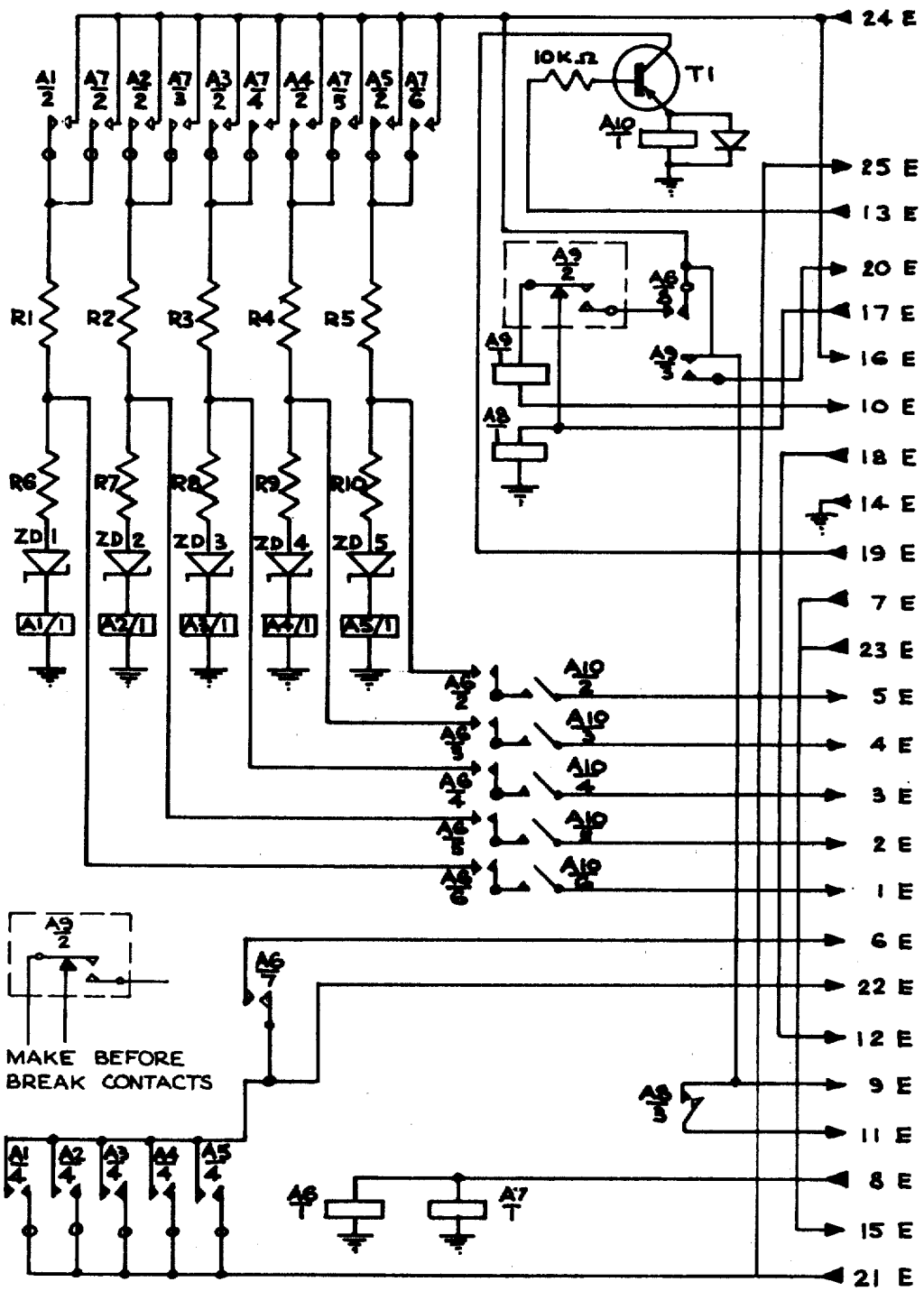

FIG. 15 is a schematic of the fault protection unit.

FIG. 16 is a schematic of the interface unit.

FIGS. 17 and 18 are schematics of the coin selection unit and means of selecting denomination groups.

FIG. 19 is a schematic of the logic unit.

FIG. 20 and including FIG. 20A is a schematic of the denomination routing unit.

FIG. 21 is a schematic of the light beam photosensor unit.

FIG. 22 is a schematic of the note selection station and includes the station cancel unit and coincidence initiating unit.

FIG. 23 is a schematic of the note accuracy test unit.

FIG. 24 is a schematic of the counter light beam photosensor unit.

Figure 25:
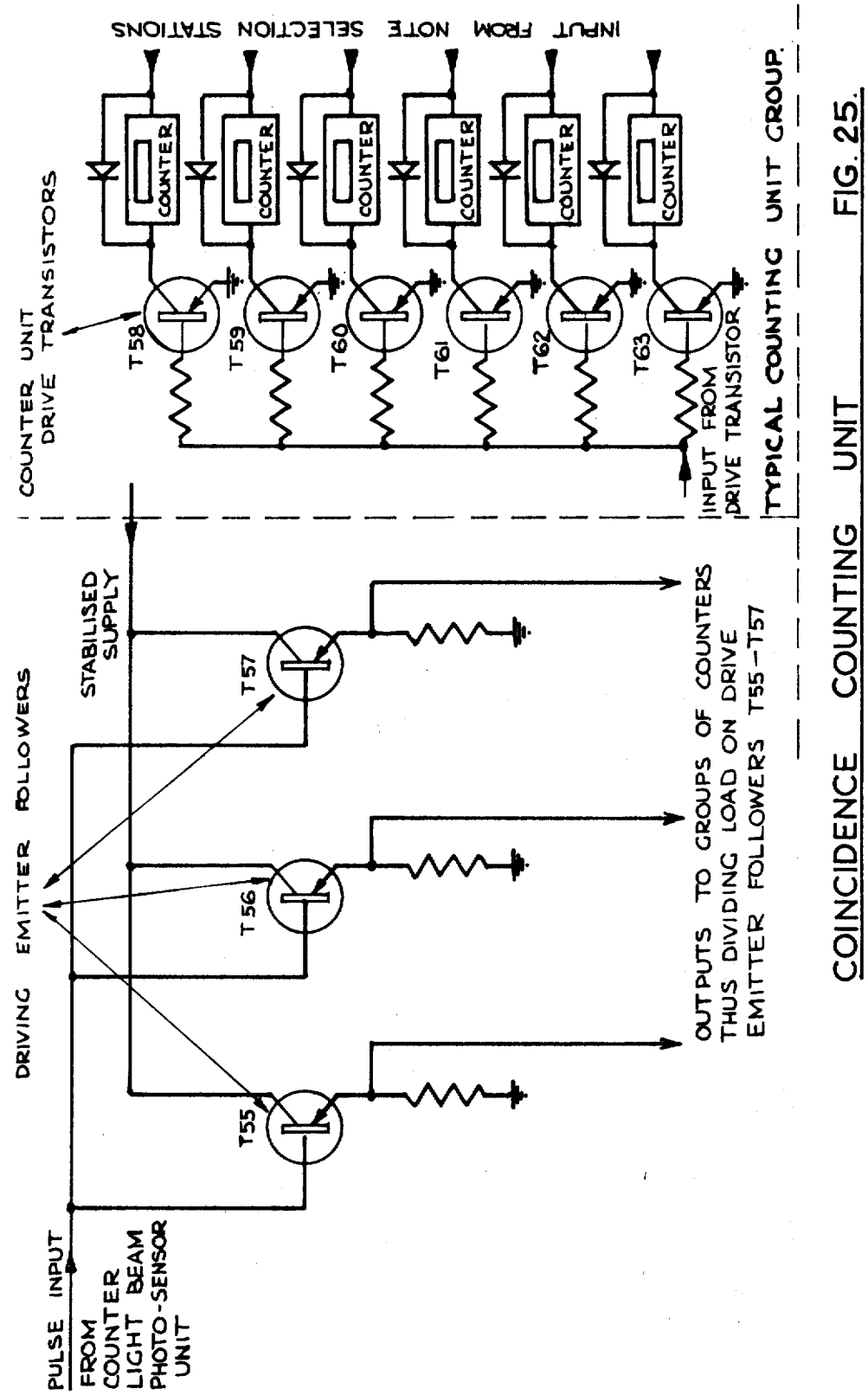

FIG. 25 is a schematic of the coincidence counting unit.

Figure 26:
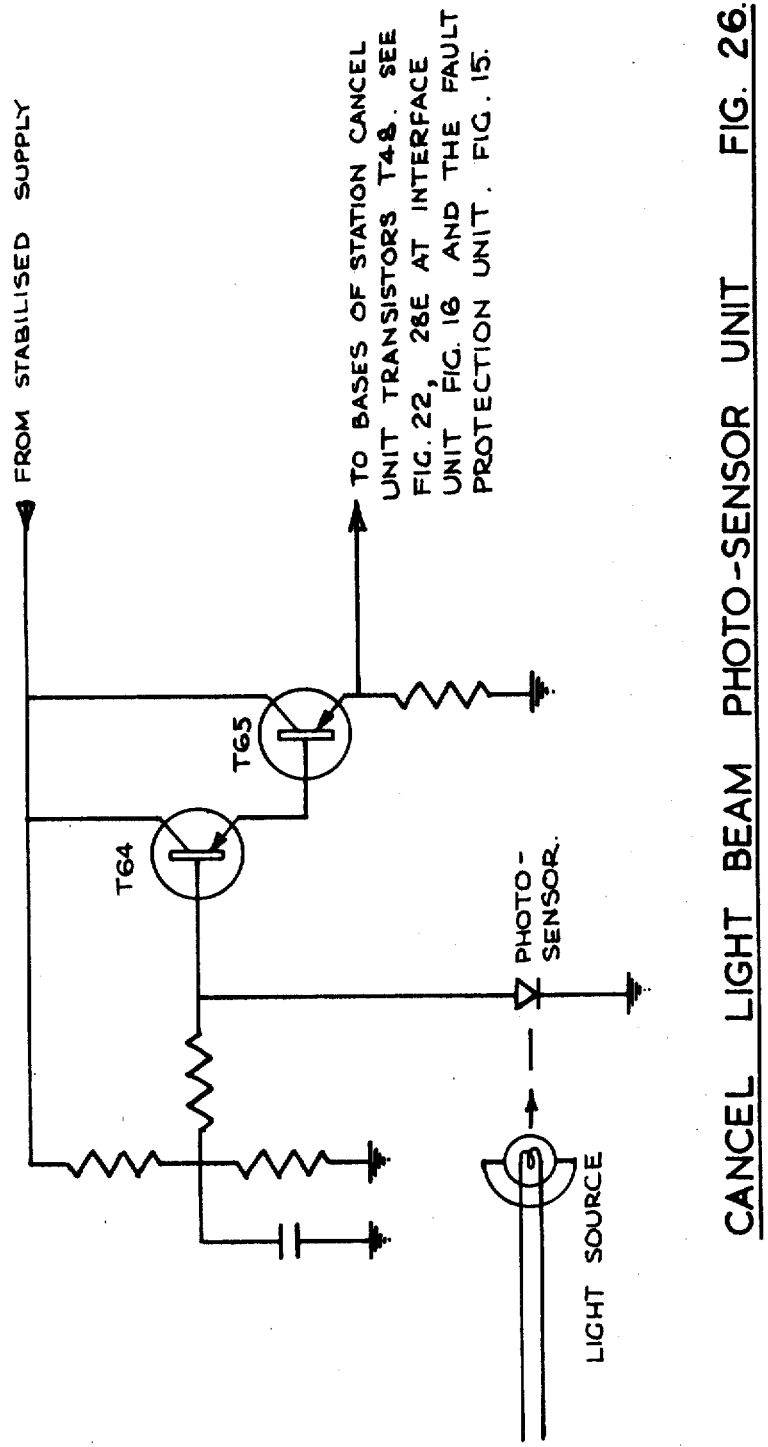

FIG. 26 is a schematic of the cancel light beam photosensor unit.

Figure 27:
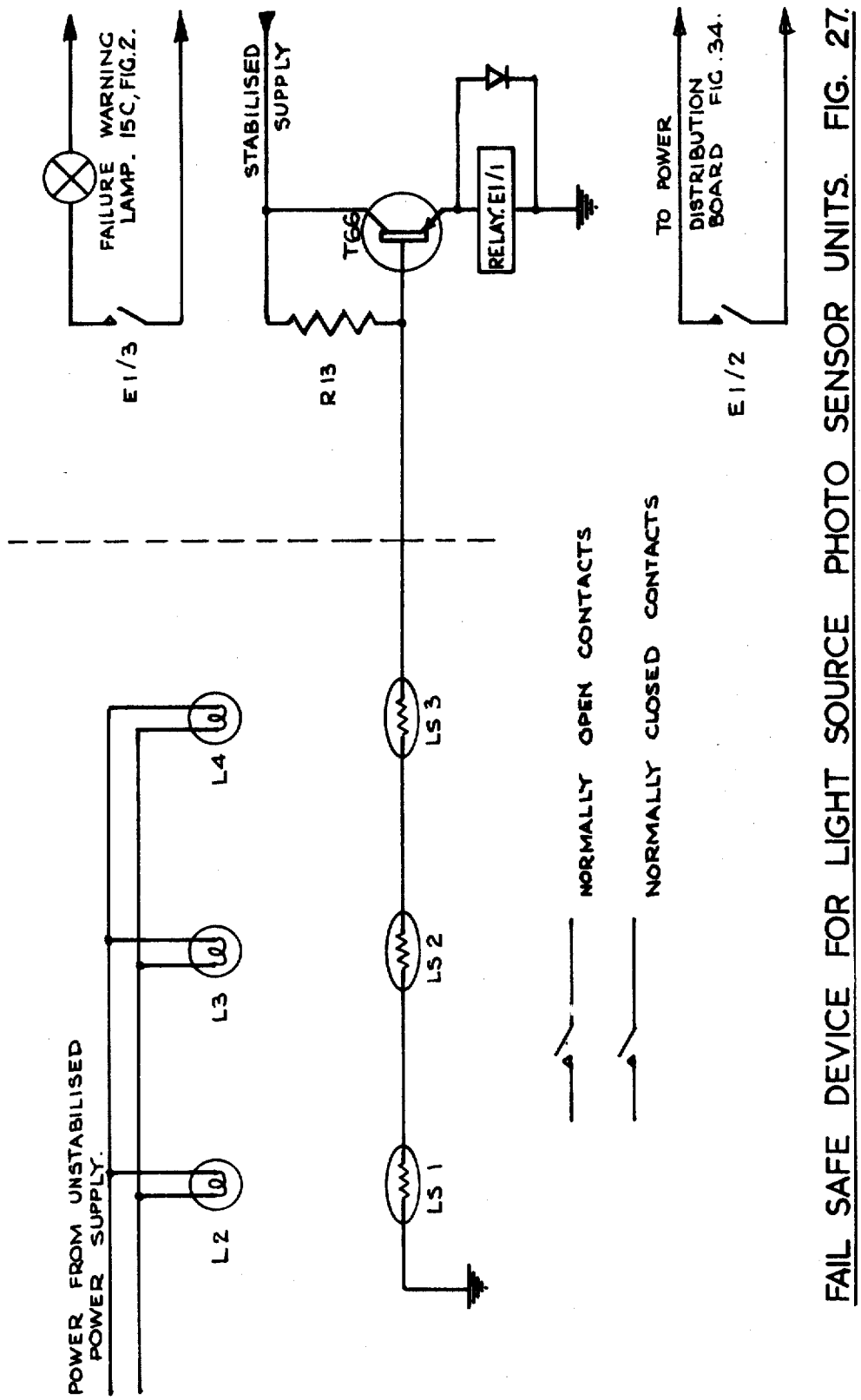

FIG. 27 is a schematic of the fail-safe device for the light source photosensor units.

Figure 28:
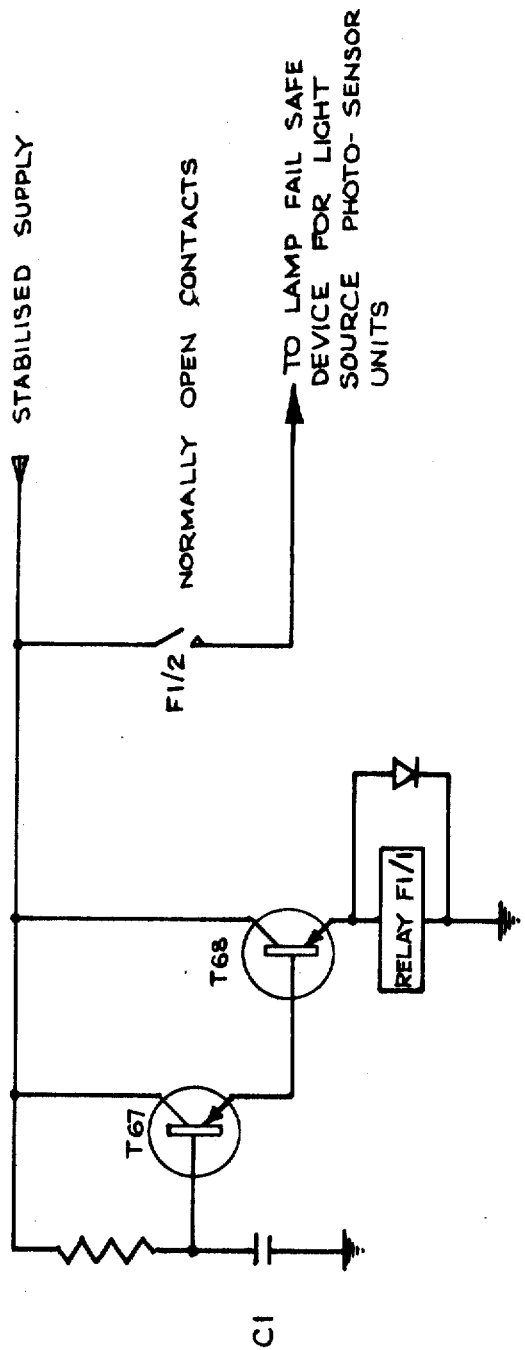

FIG. 28 is a schematic of the delay timer.

Figure 29:
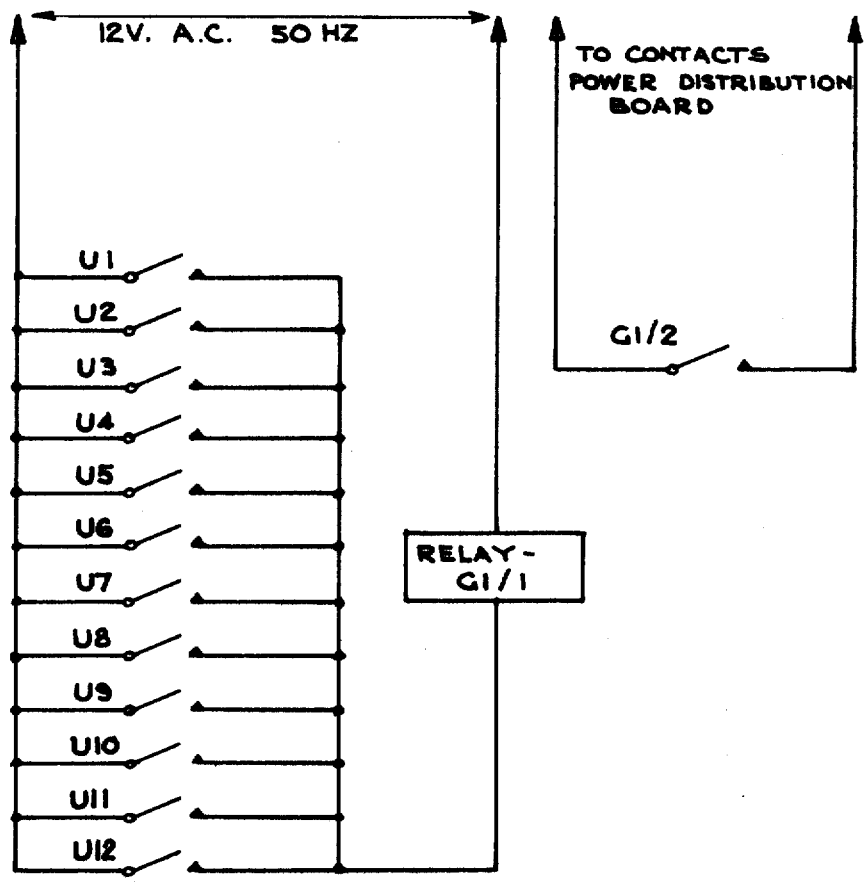

FIG. 29 is a schematic of the cabinet interlocking system.

FIG. 30 is a schematic of the stabilised power supply.

FIG. 31 is a schematic of the unstabilised power supply.

Figure 32:
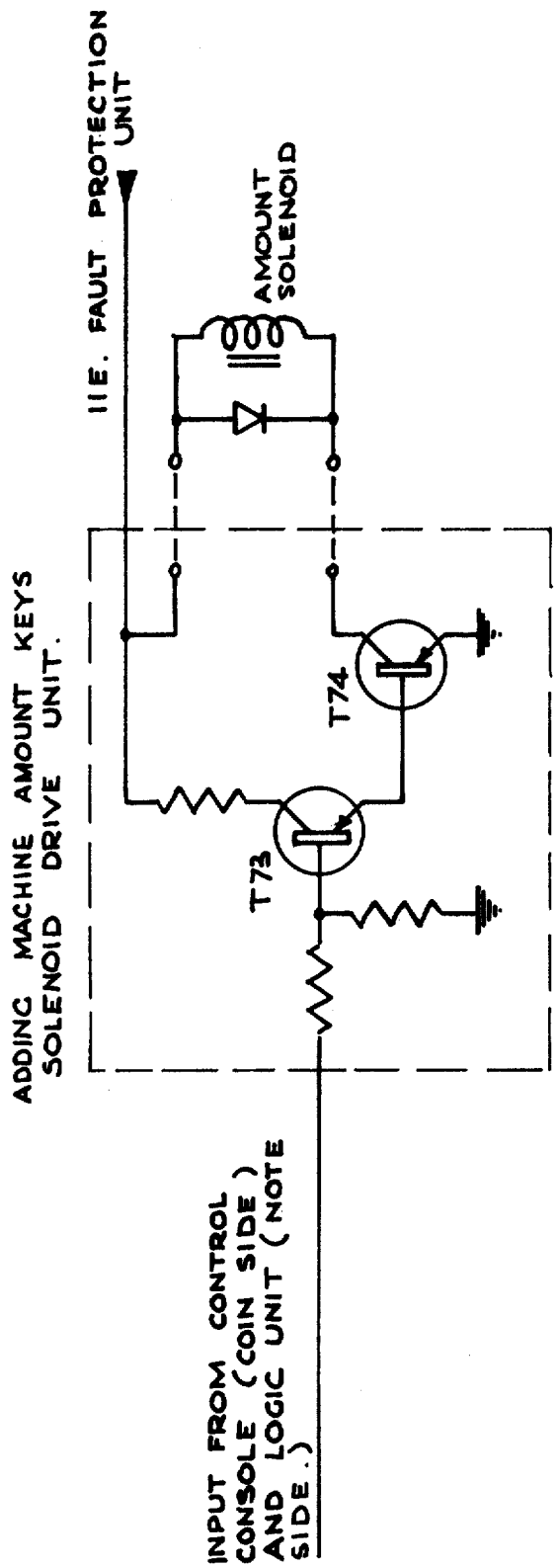

FIG. 32 is a schematic of the adding machine operating unit.

Figure 33:
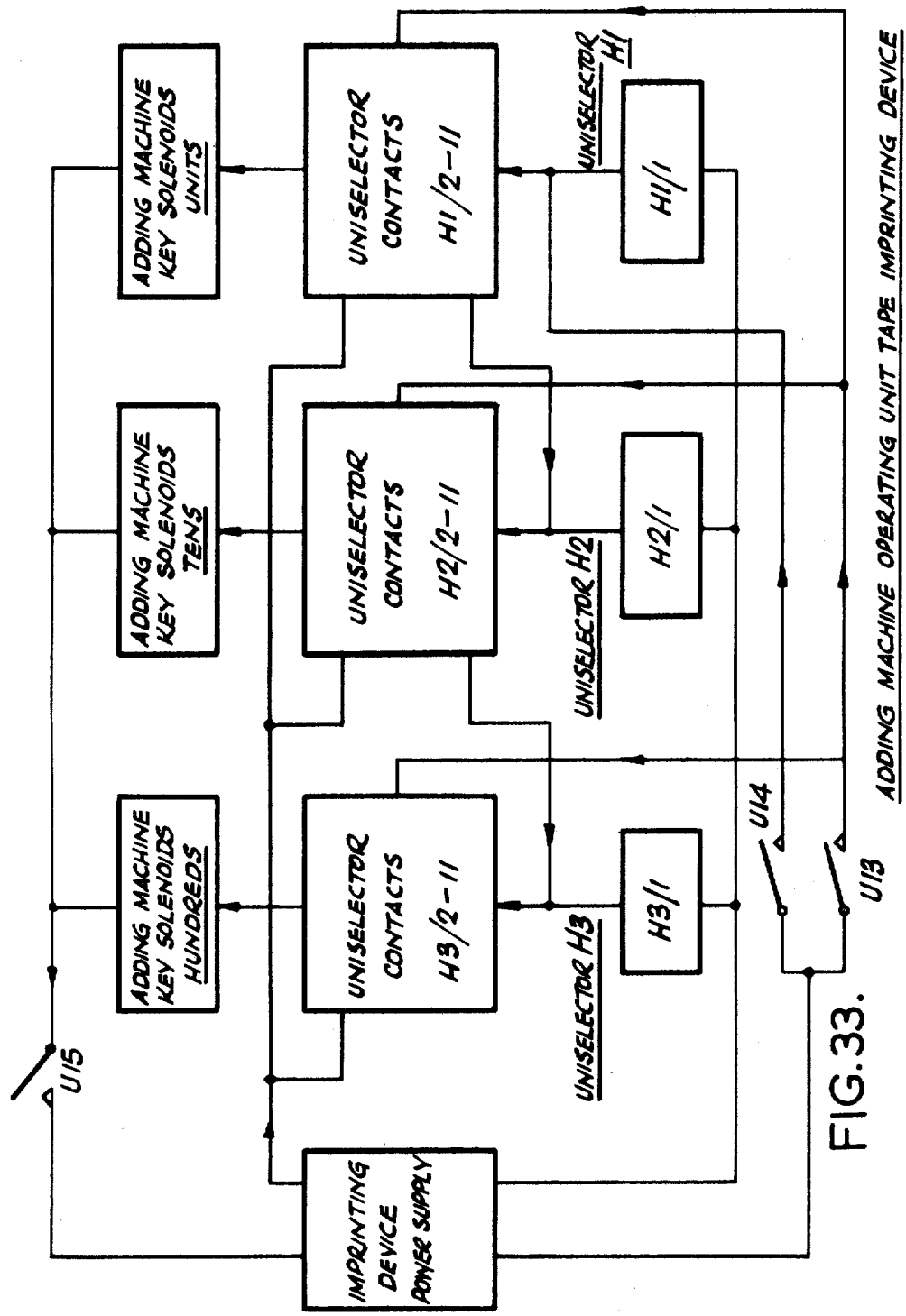

FIG. 33 is a block diagram of the adding machine operating unit tape imprinting device.

FIG. 34 is a block diagram of the power distribution board.

The following is a primary description of the principal functional components of one practical arrangement of the invention. However, subsequent disclosures in this specification are not to be regarded as limiting in any respect since alternative means may be employed to perform a function or functions without departing from the broad outline of the invention as hereinabove set forth.

This primary description will be followed by a more detailed description of the component parts, after which the electronic circuitry will be explained relative to wiring schematics and block diagrams.

To render the machine, according to the invention, reliable and "error-proof" in operation, a number of safety devices or "fail safe" features may be incorporated in the machine, the provision of which is hereinafter referred to, but such devices are not essential to the generic concept of the invention.

It is to be understood that the particular machine described is basically electrically operated and can be adapted to any mains system or source of electric supply.

There is provided also a source of compressed air supply and a source of vacuum supply for effecting certain operations.

While the following description is related to the prototype machine, the individual functions of the machine may be operated alternatively by mechanical, electrical, electronic, pneumatic, vacuum or hydraulic means and controls may be additionally by magnetic, optical radio active isotope and other particle transmission means.

Referring to FIG. 1, which is a block diagram of the functional components—

*The command device.*—This comprises the following:

Data input means (block "A") which receives the predetermined pay data and may be a manually operated push button console, or automatically dictated such as by punch card, tape, or any other suitable manual or automatic means. The present description relates to a form of manually controlled console, hereinafter termed "control console," or merely "console" for brevity.

*Fault protection unit* (block "B").—Commencing with the control console, the fault protection unit acts in conjunction with an interface unit and has a three-fold function:

(a) To avoid two or more buttons being depressed in the same digital column (or group of buttons). Upon detection of such a fault, the unit functions to erase and reset the control console.

(b) To cancel the stored information held within the control console, upon receiving a signal when the cancel light beam is interrupted.

(c) To provide an operating pulse for the adding machine motor bar upon receiving a signal from the interface unit.

The interface unit (block "G") is interconnected between the control console and the coin dispenser. It controls the operation of the coin dispenser, the adding machine, and the cancellation of the control console setting.

Coin selection unit (block "H") has means for selecting a denomination group. This also comprises a logic unit.

Note selection unit (block "F") includes means for selecting a preferred denomination group. It also comprises a logic unit and a denomination routing unit.

The summing device which can be remote from the control console and adding machine, comprises a frame or cabinet in which are mounted the functional components of the device in organised relationship. These components comprise:

A note dispenser (block "C") comprising bulk note storage units and means for presenting notes one at a time from the storage units.

Note transfer means (block "D") comprising means for transferring notes from the note storage units to a collating device, means for determining note transfer mechanism activity during cycle, and means for checking accuracy, counting, and finally resetting machine for next pay group.

Collating device (block "E") comprising conveyor means for collecting and conveying notes as selected to an assembly station.

On the coin side there is—

Coin dispenser (block "J") for dispensing coins as selected to the assembly station.

Assembly station (block "K"). This assembles the notes and coins delivered and includes means for packeting.

Referring now to FIG. 2 et al. for greater detail of description—

*The command device.*—This comprises the following:

*Data input means "A."*—This consists of a control console which comprises a keyboard 10 which may be set for a pay group by depressing the appropriate combination of keys or buttons 12. Signals are transferred immediately to the logic unit and denomination routing unit, described hereinafter, for processing in preparation for action on depressing the console motor bar. The continuous operation of the machine is not affected by this setting until the console motor bar 14 is depressed. The sequence of collating events carried out by the summing device commences on energizing the motor bar 14.

Preferably a conventional adding machine 18, or similar recording equipment is connected to the console by the command circuit so as to record a progressive total of amounts paid out, for purposes of balancing, ledger keeping, etc.

The control console is designed as a plug-in unit feeding information to the logic unit. In the present case, it is arranged for two standard paybreaks within the machine's pay-out capacity—

(i) Maximum number of notes for a given pay group (left and right side).

(ii) Minimum number of notes for a given pay group (right side).

The total button is indicated 11; 14 is the motor bar, and 13 the cancel button.

A switch 16 changes over the machine from one standard paybreak to the other. A warning lamp 17 denotes a fault (see fault protection unit).

On a control panel 15 handy to the operator, there is an emergency stop button 15a, which de-energizes the total machine, and a motor start button 15b which energises the motor contactor for starting the motor driving the mechanical operations of the machine after all other contactors are energised in sequence, ensuring that all sections of the machine are energised. There may also be a note counter panel 19 and a compressed air control panel 19a.

The fault protection unit "B" is constructed of relays, Zener diodes and associated resistors.

(a) The unit gives fault protection to digital columns or groups of button keys 12 on the control console. The operational power to the control console is fed via a relay. Within each digital column circuit, a Zener diode is connected.

In the event of two or more buttons 12 being depressed within the digital column or group, the associated Zener diode drops out of conduction.

A relay in circuit with the Zener diode is de-energised, breaks contact, and disconnects the power to the column or group, resetting the control console button keys in that column or group only. A contact on this relay closes, operating the warning lamp 17 indicating that corrective attention is necessary.

To reset the fault protection unit relays and control console in preparation for the repeat pay command, the cancel button 13 is depressed on the control console and the complete console setting returns to neutral. At the same time, a pulse is sent to cancel the setting of the adding machine 18. However, at this stage, no setting is present on the adding machine since the console motor bar has not been depressed, but a tape imprinting function is cancelled hereinafter described in the "Electronics of the Machine" section. The adding machine setting, that is, the setting up of the amount buttons, is performed by depressing the console motor bar. The console motor bar is only depressed after an obvious error is rejected and the operator is ready to proceed.

(b) The payroll information fed to the machine is stored in the control console. The console resetting is effected upon the release of the notes by interrupting the cancel light beam which pulses the fault protection unit and the interface.

The fault protection unit resets the console setting. The interface de-energises the console motor bar latched relay, and removes power supply to the light beam operated cancelling unit in the fault protection unit.

This light beam cancelling unit is a unit apart from the button 13 operated cancelling unit on the console (see also interface hereinafter).

The control console is reset in readiness for the next pay group.

(c) The adding machine motor bar solenoid is energised from a pulse leaving the fault protection unit after receipt of a signal from the interface as the counter light beam is interrupted. Prior to this, however, the adding machine amount solenoids are pulsed from the fault protection unit on depressing the console motor bar as referred to hereinabove.

The control console is capable of being set up for the two standard paybreaks above referred to. It cancels manually an operator setting error, provides the pulses for the totals on the adding machine and controls the pay machines operating sequences on energising the motor bar 14 once the full data is in store. On manual cancelling of an operator's setting error, the fault protection unit transmits a pulse to the cancel button 18a of the adding machine, and simultaneously transmits a pulse to the interface which cancels all information set up on both note side and coin side therein.

These operations are controlled by the fault protection unit in conjunction with the interface. The console controls the actions of the coin dispenser through the interface.

The fault protection unit is essentially an electronic device, the functioning of which is more specifically described with reference to circuit schematic FIG. 15 later in this specification.

*The interface "G."*—This functions to —

(a) Control the coin dispenser;
(b) Control the adding machine motor bar operation;
(c) Control the cancellation of the control console setting.

As the coin button keys on the console are depressed, power is supplied to the corresponding transistors in the interface.

As the note button keys on the console are depressed, signals are transferred immediately to the logic unit and the denomination routing unit for processing in preparation for action on depressing the console motor bar.

Operation of the console motor bar supplies power to the "gate" transistor governing the input of power for the initiating light beam photosensor unit pulse, counter light beam photosensor unit pulse and cancel light beam photosensor unit pulse within this unit on the note side, and the input of power to the logic unit, power transistors, relays, and finally the operating amount solenoids of the electro-mechanical coin dispenser (block "J" hereinafter described).

Depressing the manual console cancel button 13 provides the interface with a pulse from the fault protection unit referred to hereinabove.

The interface provides a signal to the fault protection unit upon the breaking of the counter light beam, to pulse the adding machine motor bar once (see fault protection unit).

The cancel light beam photosensor unit emits a pulse to the interface which de-energises all relays in the interface and fault protection unit concerned with the control console, but not those relays concerned with fault detection or error proofing throughout the machine.

*Coin selection unit, and means of selecting denomination groups "H."*—A command is transmitted from the control console buttons to transistors at the interface. The output pulse from the transistors is forwarded to interface relays which control contacts supplying input signals to the coin dispenser logic unit. The coin dispenser logic unit receives these signals from the interface when the counter light beam is interrupted. This logic unit in turn pulses transistors feeding relays which govern the operation of the solenoids and coin counters of the coin dispenser.

The logic unit is cancelled by the pulse emitted from the cancel light beam photosensor unit to the interface which de-energises all relays.

*Note selection unit and means for selecting preferred denomination group "F."*—The note selection unit is comprised of—

(a) A logic unit, and
(b) A denomination routing unit.

The logic unit comprises a "memory" of diodes. These may be set to pay out a given denomination grouping allowing a minimum or maximum number of notes for a given pay group. These diodes logically rearrange the stored information and transfer the resulting signals to the denomination routing unit (D.R.U.). The D.R.U. comprises one logic output distribution means per note station. The pulse received by the D.R.U. is passed on to the station operating mechanism relays and associated circuitry comprising the note selection station.

The stored information in the control console is fed to the logic unit whose memory of diodes logically rearranges the stored information and transfers the resulting signals to the denomination routing unit. The signals are simultaneously fed to the power transistors of a power amplifier unit which finally energises the adding machine.

The denomination routing unit compiles the information from the logic unit and presents its to transistors. The transistors act as power amplifiers and emit an output pulse on depressing the control console motor bar. The machine at present described proposes utilising eighteen note stations, viz. nine $20, two $10, five $2, and two $1 stations. However, this arrangement can, of course, be varied to suit any other requirement.

The note selection unit is essentially an electronic device, the functioning of which is more specifically described with reference to circuit schematic FIG. 22 hereinafter.

*The summing device.*—This is housed in a cabinet having a frame 20 (FIG. 3) supporting removable metal and glass enclosing panels and the various functional components of the device.

*The note dispenser "C."*—This includes a plurality of note storage units, in the form of rectangular storage boxes 22, open at the top and one end, and fixed to the frame 20 in position adjacent to the note transfer means "D." Notes 21 are loaded into position within the storage boxes, and there is a hinged retaining door 22a held by spring clips 22b in the closed position. Preferably, there are eighteen such storage boxes 22, constituting eighteen note stations, as hereinabove set forth. Only some of the boxes 22 are shown in FIG. 3, as they and their related equipment are similar, though box size may vary to suit various note denominations.

*The means for presenting notes one at a time from the note storage units.*—This comprises suction cups 23 mounted on a lifting plate 24 disposed above each box 22. A source of partial vacuum is connected to these cups 23. Each plate 24 is lifted from and lowered onto the stack of notes in the respective box 22 by means of a piston rod 26 operating in an air cylinder 25 enabling one note to be presented on the suction cups 23, at the required time and location, in readiness for picking out by the transfer means "D." The air cylinders 25 are supported on the storage boxes and the piston rods 26 are operated in a double acting capacity by suitable control valves correlated with the functioning of the note transfer means, further explained later.

It is to be understood that only the pickers 30 routed by the denomination routing unit to pick notes 21 from the suction cups 23, do so, the other notes presented remain on the suction cups and return with the lifting plates 24 to the bottom of the stroke of the piston rods 26, together with the lifting plates containing no notes, i.e. from which the notes have been picked, whilst the empty lifting plates pick up by their suction cups, and lift another note from the respective note storage boxes 22 in each operating cycle of the machine.

*The note transfer means "D."*—This comprises picker mechanisms of a mechanical nature (FIGS. 4 and 5), there being one picker 30 for each note storage box. Each picker 30 oscillates between its particular note storage box 22 and a collating device "E." The pickers are rigid with the shaft 31, which is free to oscillate in bearings 32 (FIG. 6) mounted on the frame 20 so that all pickers move in unison. The picker oscillating drive is by means of electric motor 50 (FIG. 3) driving, through a chain 51 and bevel gear box 52, a main shaft 53 which in turn drives counter-shaft 33 through chain 54 and crank plate 34 having a crank pin 35 to which one end of chain 36 is attached.

Rotation of plate 34 pulls chain 36, turning sprocket 37 through an angle of part-revolution causing scissor arms 38a, 38b to move pickers 30 forward (i.e. to the right, FIG. 4) to pick notes presented by the lifting plates 24.

On return to the back position (i.e. to the left, FIG. 5b), the pickers move by gravity as tension on the chain 36 is released, and there is a dwell time on the driving plate 34. During this period of dwell, the scissor arms pivot pin 39 comes into contact with the chain 36 and takes up any slack there may be in the chain and holds the pickers in the back position until time for the next oscillation. Operation of the pickers is continuous.

Preferably, there is a counter-weight 40 arranged to partly balance the weight of the picker assembly and relieve the load on the motor 50.

The pickers have picker jaws 41, preferably operated by heavy duty solenoids 42 and adapted to close over the presented notes 21, picking individual notes, when commanded, from the note presentation means and transferring them to receiving cradles 60 located on the track 61 of the collating device.

The picker lower jaw 41b is rigid with the lower jaw arm 41c, which is rigid with the picker assembly 30. The top jaw 41a is insulated at 44 from the top jaw arm 41d which is pivotable at 43 responsive to operation of the solenoid 42 through a push rod 45. The solenoid 42 actuates the push rod 45 through a spring 46. Return of the moving upper jaw 41a to its fully open position, as shown in FIG. 4, is effected by gravity acting on the static mass of the push rod, the solenoid plunger, and associated parts. The jaws 41 in the closed position are shown in broken line in FIG. 5.

Figure 7:
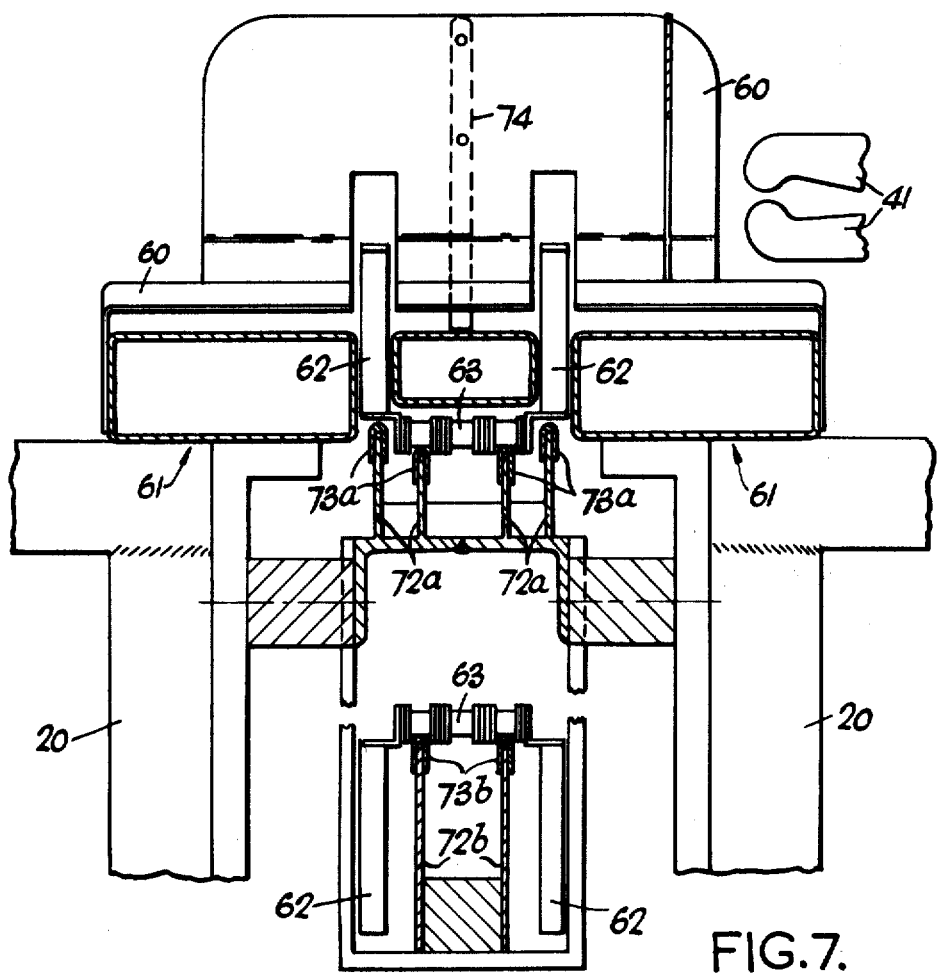
FIG. 7 is a cross-section, to an enlarged scale, of the collating track taken on the line 7—7 of FIG. 8.
Figure 8:
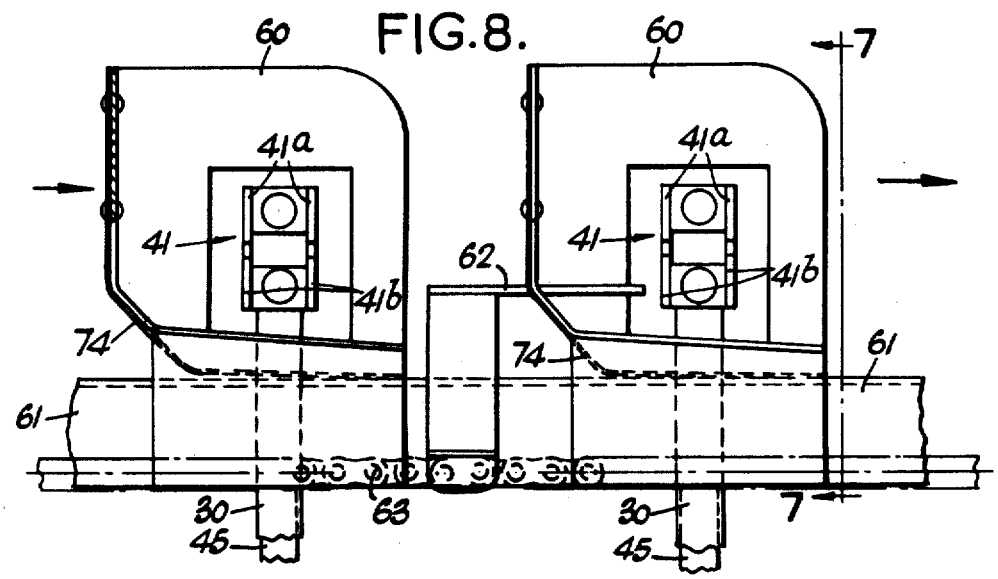
FIG. 8 is a side elevation of a portion of the collating track showing in detail the conveyor chain, the collating fingers and the cradles.

*The collating device "E."*—This is part of the means for collecting and conveying the selected notes to the assembly station, which is basically an endless conveyor system moving continuously along the collating track 61 (FIGS. 3 and 9 for arrangement and FIGS. 7 and 8 for details) in the direction of the assembly station "K." The notes picked out by the pickers 30 are deposited, by the timed opening of the jaws 41, onto the cradles 60 mounted on the collating track. Fingers 62 mounted on a triplex chain 63 which forms the conveyor means, move through the cradles 60 collecting the notes 21 one upon the other. The notes are subsequently discharged at the assembly station at the end of the collating track 61, further elaborated later.

The drive for the conveyor chain 63 is from the input shaft to the bevel gearbox 52, through sprocket 64 and chain 65 to sprocket 67 fast on drive countershaft 66. Also fast on counter-shaft 66 is sprocket 68, which drives conveyor chain 63. To adjust the tension on conveyor chain 63, the counter-shaft 66 is arranged to be vertically adjustable, after which the tension on chain 65 is adjusted by take-up sprocket 69.

The conveyor chain 63 travels over fixed idler sprockets 70a, 70b, 70c and 70d. Chain 63 is also provided with support members 72a and 72b to support and guide it between the idler sprockets. These support members may have removable and replaceable wear-strips 73a, 73b on the contact surface.

There may also be provided light strip type springs 74 fixed to the back of each cradle 60 to retain notes 21 on the track 61 as they move through so as to prevent them rising and to ensure even stacking one on top of the other as they are collected by the fingers 62.

In order that the notes are properly positioned on the cradles, auxiliary downwardly directed air jets are located above the cradles.

The passage of the fingers 62 along the track 61 is timed to commence immediately after the depositing of the notes onto the cradles 60 by the pickers 30.

*Means for correlating the note dispenser and the note transfer means.*—This comprises cams 80a, 80b mounted on the drive counter-shaft 33, poppet valves 81a, 81b, 3-port valves 82a, 82b, and low pressure air distribution ring main 85 (FIGS. 3 and 10). The main vacuum line from the suction cups is through the manifold 79 connected with the vacuum source. The vacuum is applied to all suction cups continuously through tubes 79a and there is preferably a gauge 78 indicating the degree of vacuum at each lifting plate 24.

The piston rods 26 and air cylinders 25, which operate the lifting plates 24 are, as stated before, double acting. Constant air pressure, from compressed air distribution ring main 85, is applied to the lower side of the pistons, i.e. the rod side via air line 86 so that the lifting plates 24 are normally held in the raised position.

Referring to diagrammatic FIG. 10, cam 80a operates poppet valve 81a which in turn signals a bank of 3-port control valves 82a (one for each cylinder) to admit compressed air from ring main 85 in timed relation to the upper side of the pistons in cylinders 25, via air lines 87 and 87a, whereupon, because of the greater piston area (as compared with the rod side), the rods 26 together with the lifting plates 24 are moved downwards so that the suction cups 23 contact and press upon the stack of notes in the storage boxes 22.

The lifting plates 24 are operated by 3-port control valve 82a correlated with the functioning of the picker mechanisms by the poppet valve 81a actuated by the cam 80a mounted on the drive countershaft 33. This drive countershaft 33 also drives directly the pickers 30 and operates at one revolution per cycle.

The 3-port control valve 82a is operated by poppet valve 81a and cam 80a to intermittently admit compressed air to the upper end of cylinder 25. On the downward thrust of the piston rod 26, a note is picked up on the suction cups 23. Air is then released from the cylinder upper end by the releasing action of cam 80a, on poppet valve 81a thus resetting 3-port valve 82a to exhaust through line 89 into pipe 88 with a 3-port stop valve 82b at its end.

Disallowing the air from the cylinders 25 to exhaust directly to atmosphere and trapping it in the combined volume of pipe 88, cylinder 25 and associated connecting tubes 87a and 89 (the total of which is of predetermined volumetric capacity) before being finally released, causes the lifting plate 24 (FIG. 3) to rise a short predetermined distance and there dwell for an instant before proceeding on its upward course. This dwell is for sufficient duration to allow a second bank note, that might possibly be clinging to the one being lifted, to fall back on to the bulk stack in the note storage box 22.

After the dwell, the 3-port stop valve 82b is opened by the poppet valve 81b actuated by cam 80b, and all air trapped in the upper end of the cylinder 25, the pipe 88, and the exhaust lines 87a and 89, escapes to atmosphere allowing the lifting plates to rise to the location required in preparation for a picking operation.

Cams 80c, 80d, actuate poppet valves 81c, 81d, to signal a 5-port control valve 83 (FIGS. 3 and 9) to admit compressed air in timed relation to the upper side and lower side respectively of a piston in cylinder 90 which, through piston rod 91, operates a gate 92 controlling the release of coins, selected in the coin dispenser 100 (further described hereinafter) to a chute 102 leading to the assembly station "K."

As the construction and operation of cam-operated poppet valves signalling 3-port and 5-port control valves to actuate piston-in-cylinder operating mechanisms in a pneumatic system is well known, no further description in this regard is deemed necessary in this specification.

It is to be understood that only the pickers 30 routed by the denomination routing unit to pick notes 21 from the suction cups 23, do so, the other notes presented remain on the suction cups and return with the lifting plates 24 to the bottom of the stroke of the piston rods 26, together with the lifting plates containing no notes, i.e. from which the notes have been picked. The empty lifting plates pick up and lift by their suction cups, other notes from their respective note storage boxes 22 in each operating cycle of the machine.

*The coin dispenser "J."*—This may be a conventional commercial type machine 100, having coin magazine 101 (FIG. 9), the manual keys being converted to be solenoid operated, and which machine supplies the coins required via a chute 102 to the assembly station. The denomination groups are determined by the interface unit "G" and the coin selection unit "H," which are essentially electronic devices.

The release of the coins selected to the chute 102 at the appropriate time is effected by the gate 92 as hereinbefore described.

*The assembly station and means of packeting notes and coins "K."*—In the preferred arrangement, fluid logic equipment, and in particular a purely pneumatic logic system is utilised to energise pneumatic cylinders 140, 141 (FIGS. 3 and 9) operating the assembly station mechanisms.

It will be appreciated by those skilled in the art that other means, such as electronic devices, may be employed for this purpose. Conversely, it will be apparent that many functions of the pay machine performed electronically, as herein described, could be achieved by the pneumatic logic equipment now to be explained, suitably adapted.

The pneumatic cylinder 140 operates the collector arm 147, which collects the notes, stacked one upon the other, from the continually moving collating fingers 62 on the conveyor chain and carries them to the assembly station 150. As shown in FIGS. 3 and 9, collector arm 147 is pivoted for arcuate movement about a pivot 148 by a piston rod 149 actuated by cylinder 140.

The pneumatic cylinder 141 operates a blade 143, which performs the folding and packeting of the notes.

Considering now the present case of packeting notes as received at the assembly station, the manner of folding the notes is determined by the size of the pay envelope used, and this envelope size is frequently dictated by the particular firm, business or payee concerned.

The most conveniently sized envelope for packeting purposes is one that will receive notes folded centrally to half their length dimension, preceded by, or followed by coins.

The following description refers to means for so folding the notes. This comprises a reciprocable blade 143 having a blunt rounded operating end 144 which is applied to the notes' centre and forces the collected notes through a slot 145 in the collating track 61 within the assembly station 150. The folded notes are transferred through a continuation chute 146 into the awaiting packet or envelope 160. The coins having been selected and retained by the gate 92 at the coin dispenser 100 are liberated to the chute 102 and thence to the chute 146 at the appropriate moment.

It will be understood that other mechanical means may be utilised to fold the notes into any finished condition, for example two-fold, three-fold, rolled and so on, prior to entry into the packet or envelope which may be of any size, length and breadth, to suit the payee.

The following description sets out details of the assembly station for the assembly of notes and coins delivered, and includes means of packeting. To fully understand the method utilised to provide signals to energise the pneumatic cylinders 140, 141, a brief description of the pneumatic logic elements follows.

The circuitry of the pneumatic logic system is basically simple. It can be built up as required to perform specific functions or sequences of functions such as building up a memory, sensing, measuring, discrimination feed back, level detection, counting, safety devices, process control systems, timing and so on.

Figure 11:
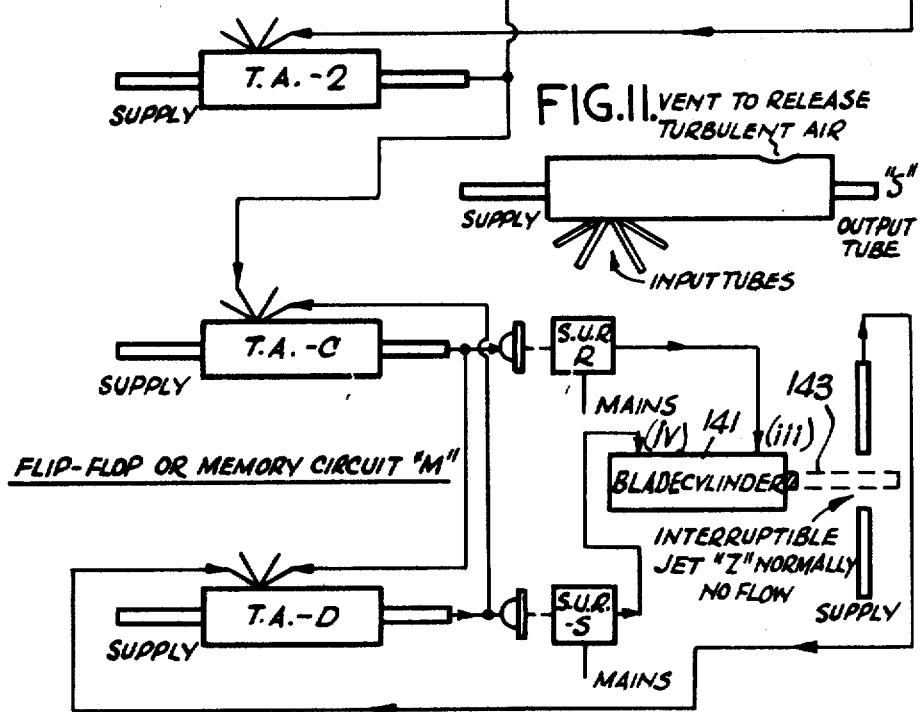
FIG. 11 illustrates diagrammatically a turbulence amplifier.

The actual heart of the system is a device known as a "Turbulence Amplifier" hereinafter denoted T.A. (see FIG. 11). The T.A. is really a form of pneumatic switch which has no moving parts and cannot wear out. Basically, it consists of a supply tube and an output tube co-aligned and separated by a gap into which gap is pointed a comb of a number, say four, input signal tubes. Under normal conditions, the main air stream consists of a supply of air at 8–12 inches of water gauge pressure and an output pressure of approximately 4 inches water gauge. This air is filtered and clean and passes in a smooth laminar flow across the gap. If, however, a very small side jet of air is emitted from one of the input signal tubes, the main air flow across the gap becomes turbulent and ceases to flow out through the T.A. output tube. In other words, a very slight pressure signal into one of the input tubes is sufficient to cut off the much larger main air flow. When the small signal ceases, laminar flow is resumed and the main air stream continues to pass smoothly through the T.A.

This principle can be utilised to make banks of T.A.'s carry out all manner of functions by merely piping circuits from one T.A. to the next in logical arrangement to complete the circuit.

The supply tube feeding the output tube without interference from an input signal results in an output signal S, and the T.A. is "on."

Any one of the input tube signals will turn off the output signal S, and the T.A. is "off."

The input signals are obtained from several devices. The device employed in this specification is an "Interruptible Jet," which is a form of "open tubulence amplifier" and can detect objects disturbing its open flow without physical contact, thus interrupting the signal to a T.A. being part of the logic unit.

To convert the logic output signal into a pneumatic output of a much higher pressure, a "step up relay," hereinafter denoted S.U.R., is used. When a low pressure signal is applied to the S.U.R. a set sequence of events within the S.U.R. results in an output of high line pressure for operating the integer producing the end result.

Figure 12:
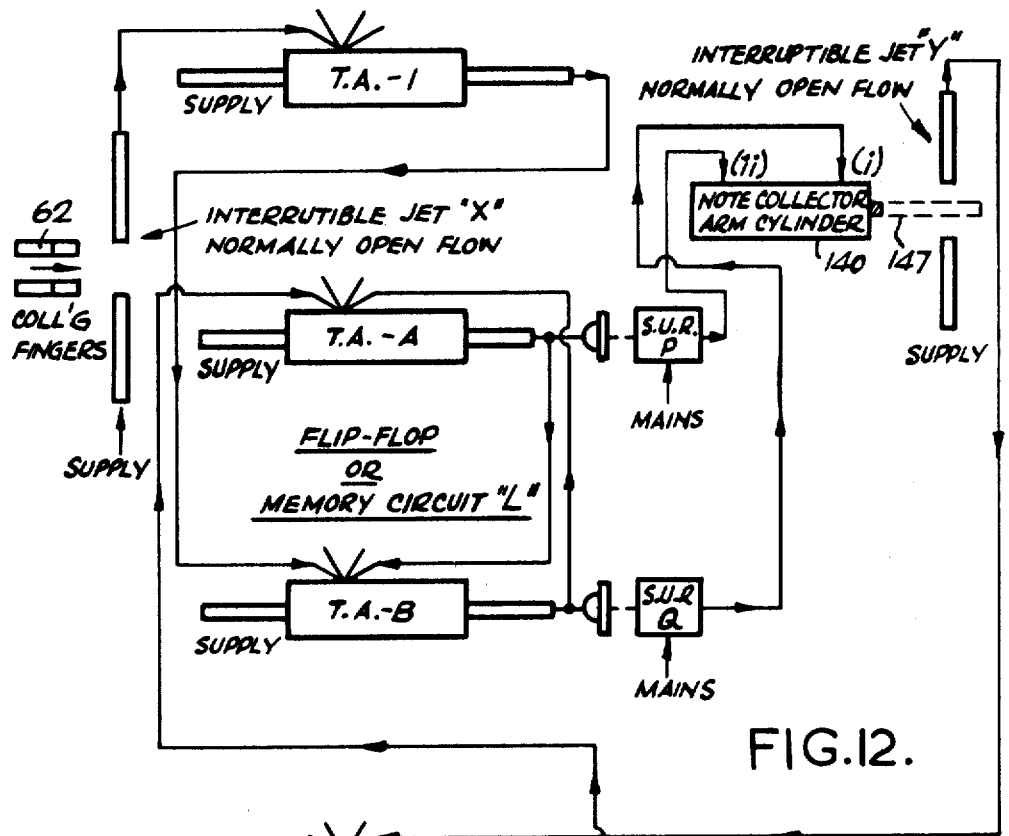
FIG. 12 is a diagram of the pneumatic logic circuit employed in operating the note collector arm and the note folding blade.

FIG. 12 shows the logic circuit associated with the assembly station. The following relates to the detailed description of the assembly station and folding device operation in sequence.

The collating fingers 62 mounted on the triplex chain 63 and moving continuously, pass through the open flow of air of the interruptible jet "X" (see also FIGS. 3 and 9) which turns T.A.–1 on for an instant (T.A.–1 is normally off). T.A.–1 turns T.A.–B off and resets the memory circuit "L" to hold T.A.–B off and turns T.A.–A on, since there is no input signal from T.A.–B or T.A.–2. T.A.–A pulses S.U.R.–P and high pressure air enters cylinder 140 at (ii) thus moving the note collector arm 147 quickly past the collating fingers 62, (which by the time the above sequence of events has taken place are just ahead of the arm 147) collecting the conveyed notes and depositing the notes in position over the folding slot 145 within the assembly station 150.

The arrival of the note collector arm 147 at the end of its arcuate stroke causes the open flow of interruptible jet "Y" to be disturbed. T.A.–2 is turned on, for the period that the note collector arm is thus positioned, turning off T.A.–A and its signal to T.A.–B. T.A.–1 is off and T.A.–B emits a signal resetting the memory circuit "L" to hold T.A.–A off and pulses S.U.R.–Q allowing high pressure air to enter cylinder 140 at (i) returning the note collector arm 147 to its original position. Simultaneously, T.A.–2 pulses input to T.A.–C. T.A.–C is turned off removing the input to T.A.–D and since interruptible jet "Z" is normally off, T.A.–D is turned on. T.A.–D emits a signal resetting the memory circuit "M" to hold T.A.–C off and pulses S.U.R.–S allowing high pressure air to enter cylinder 141 at (iv) providing a downward force on the blade 143 onto the centre of the collected notes forcing the notes through the slot 145 in the collating track 61 and continuation chute 146 into the awaiting packet or envelope 160. At the end of the blade stroke, interruptible jet "Z" is clear of the blade and turns to open flow, and results in T.A.–D being turned off thus removing the input to T.A.–C. T.A.–2 is off and T.A.–C emits a signal resetting the memory circuit "M" to hold T.A.–D off and pulses S.U.R.–R allowing high pressure air to enter cylinder 141 at (iii) returning the blade 143 to its raised condition.

The assembly station is now reset in readiness for the next packeting operation.

The coin dispenser and gate operation for dispensing coins to the assembly station is hereinabove described.

*Means of determining transfer mechanism activity during cycle, checking accuracy, counting, and finally resetting the machine for the next pay group.*—One light beam photo sensor unit 133 (FIG. 4), to energize any or all pickers 30 as signalled by the denomination routing unit, is continuously triggered by the motion of the picker through an initiating light beam provided by a lamp or other suitable light source 134. The light interference pulse is detected by the photo sensor 135, amplified, and passed to a coincidence initiating unit (see circuit schematic shown in FIG. 22). Pulses received simultaneously from the denomination routing unit and light interference pulse amplifier energise the coincidence initiating unit relating to the corresponding note selection station initiating relay. The coincidence initiating unit will only operate on receiving a suitable command whereupon it emits a signal to the note selection station.

A note selection station operating unit consists of three relays. There are eighteen stations as previously stated. The note selection station operating unit is more specifically described with reference to circuit schematic FIG. 22 later in this specification.

Relay 1 is utilised to energise the picker operating solenoid 42 on receiving a signal from the coincidence initiating unit.

Relay 11 is energised when a command from relay 1 closes the picker jaws 41, in the event of no note being present. When no note is present, the metallic surfaces of the jaws 41a and 41b meet and make contact, and relay 11 becomes energised.

Relay 111 is in direct circuit with a note accuracy test unit. This relay is part of the "fail safe" section of the machine and renders the machine inoperative should it become energised.

Relay 11 is interlocked with relay 111. Should relay 11 become energised, the operation of relay 111 immediately stops the machine.

For the purpose of this specification, relay 1, relay 11 and relay 111 will be denoted by relay D1/1, relay D2/1 and relay D3/1 respectively hereinafter.

*Note accuracy test unit.*—The accuracy of the transfer is examined by the note accuracy test unit 120 which is operative at all times. There is one plug-in note accuracy test unit fitted for, and situated adjacent to, each of the note transfer stations in the path to be taken by the note in being transferred from the lifting plate 24 to the cradle 60 situated on the collating track 61. Its construction utilises the light beam from a lamp, or other suitable light source, 121, and photo sensor 122 plus an amplifier and Schmitt Trigger followed by an output power amplifier.

Light transmission through one note being transferred from a bulk storage unit by a picker 30 to a corresponding cradle 60 mounted on the collating track 61 is at a sufficiently high level to retain the Schmitt trigger inactive.

However, should two or more notes be picked together, the light transmission is too small. A pulse is emitted from the Schmitt trigger, energising the relay D3/1, and rendering the machine inoperative. Error in this manner illuminates a failure and error indicator lamp 130. The design of this unit also prevents the passage of a "stray" denomination or piece of foreign material which may become packed un-noticed with the notes in the note storage box and picked by the picker.

The inclusion in the light beam of a suitably selected optically ground filter and the level output setting of the testing electronics enables this "stray" denomination test to be made. It is necessary to employ a different coloured filter for each denomination and the action taken by the machine after each test is determined by the input pulse level to the Schmitt trigger. The presence of a "stray" denomination or piece of foreign material results in a pulse output from the Schmitt trigger, energising relay D3/1, and rendering the machine inoperative. Error in this manner will also illuminate the failure and error indicator lamp 130 above referred to. The lamp indicator 130 is illuminated immediately relay D3/1 becomes energised. This lamp indicator is situated adjacent to the note transfer station at fault. Each of the eighteen stations is fitted wih a lamp indicator 130 and manually operable switch 131. Upon operation of the switch, the relay D3/1 and picker operating solenoid 42 becomes de-energised to enable the fault to be adjusted with the jaws 41 open. While this adjustment is being made, the switch 131 prevents the restarting of the machine. Resetting the switch 131 recloses the jaws 41 of the picker 30 and allows the machine to be restarted.

Included within the light source housing 121, there may be another source of light output, referred to hereafter as a secondary light source, for example ultraviolet light. The secondary light source is also directed to the path taken by the notes in passing between the bulk note storage boxes 22 and the cradles 60 mounted on the collating track 61.

The resulting reflection or transmission of the secondary light with the notes being tested is normally so small that it is impossible for a photo sensor to detect any high level of light transmission. This low level light transmission is present when a genuine note passes through the secondary light path. However, should a counterfeit note be presented by the lifting plate 24 and picked, a particularly bright light reflection and transmission results and a photo sensor detects this brilliance. On detection of a counterfeit note, the machine is rendered inoperative upon the emission of a Schmitt trigger pulse and the resultant energising of relay D3/1.

The arrangement of equipment thus described, for the detection of counterfeit currency, must be considered as variable to suit any requirements of counterfeit detection. This follows since the present equipment is utilised to detect "$10 Australian" counterfeit notes being circulated at the date of this specification and may require modification or complete replacement by another method of detection in the event of other similar notes being produced anywhere thoughout the world.

All note selection stations are fitted with a counter situated on the panel 19. The count is registered by a method similar to the coincidence initiating unit utilising a light beam photo sensor unit 136 (comprising a housing containing a light source 139 and photo sensor 139b) amplifier pulse unit and coincidence counting unit. The coincidence counting unit energises a note recording device or counter, via transistors (see circuit schematic, FIG. 25).

The pulses are received simultaneously from the amplifier pulse unit and the note station initiating the relay referred to as relay D1/1.

*Station cancel unit* (shown on FIG. 22).—A light beam photosensor unit 137 is interrupted by the path of the picker mechanism. The electrical impulse triggered by the photosensor 138 is fed to a cancel pulse unit. The amplified pulse is received by this unit's output transistors and a signal is sent to cancelling transistors. The cancelling transistors are connected across the coil of relay D1/1 of the respective note selection station. Receipt of the signal by the transistors causes a short circuit across the relay coil. The relay coil is then de-energized. All station cancel units operate irrespective of whether or not the station is operative. This ensures that all stations are reset. The whole mechanism is now re-set in readiness for the introduction of the next pay group.

*Fail safe device for light source photosensor units 133, 136 and 137* (FIG. 27).—A lighi sensitive resistor is contained within the housing of each photosensor unit light source 134, 139 and 139a. The light sensitive resistors are connected in series. Should one or more lamps fail, the resistance of the light sensitive resistor chain increases, and causes a transistor to energise a relay. The machine is rendered inoperative and a failure warning lamp 15c, situated on the control panel 15 (FIG. 2) hereinabove referred to, will glow.

*Cabinet interlocking system* (FIG. 29).—The machine operating compartments are enclosed in the frame 20 of the cabinet by removable sheathing panels (not shown). Each panel on closing, opens a micro switch. The opening of any one panel of the machine cover closes the respective micro switch which energises an isolating relay and the machine is rendered inoperative. This cabinet interlocking system safeguards everybody present from electric shock and mechanical entanglement, once a panel is removed.

*Power input* (FIGS. 30 and 31).—Preferably the power input to the machine is through a distribution switchboard which feeds two power supplies, viz.—

(1) Stabilised power supply (FIG. 30).
(2) Unstabilised power supply (FIG. 31).

*The stabilised power supply* feeds all the electronic components, logic and routing devices, adding machine operating and note testing units and the fail safe devices.

The unstabilised power supply supplies the photo sensor unit lamps, the supply through the fault protection unit, coin dispenser, and the operating media for cancel, total and motor bar of the adding machine.

*General.*—The pay machine presently described is shown as a self-contained unit, as best seen in FIGS. 3 and 9, and includes a seat 170 for the operator adjacent a desk 171, which supports the console 10. As mentioned before, the console or other data input means may, however, be located remote from the summing device for convenience or security reasons.

Although the pay machine as described has been based on paying out into payroll envelopes, it has been designed to satisfy the requirements of banking organisations and others involved in the paying out of monies to customers. In considering this aspect of the pay machine, the summing device may be stored in a vault or other secure cash storage area, and the command device with alarm fitted on the data input means may be situated near the paying teller thus thwarting the activities of hold-up bandits and like depredators.

*The electronics of the machine.*—Considering now the description of the electronics of the invention, relative to the schematic and block diagrams, the following description will proceed in the same order as previous description in this specification, commencing with the command device and followed by the summing device.

The electronic circuits are fully described hereafter with reference to FIGS. 13 to 34 of the drawings.

Referring to FIG. 13 which is a block diagram showing the interrelation of the functional electronic components:

The command device comprises FIG. 14 including 14A, 14B and 14C and FIGS. 15, 16, 17, 18, 19 and 20. FIG. 20 includes FIG. 20A The summing device comprises FIGS. 21 to 34.

The summing device includes additional circuits not previously described in this specification since they include functions which are basically electronics in composition. These comprise—

FIG. 28 which is a schematic of the delay timer.

FIG. 32 which is a schematic of the adding machine operating unit.

FIG. 33 which is a schematic of the adding machine operating unit tape imprinting device.

FIG. 34 which is a block diagram of the power distribution board.

Commencing with the command device—

*The control console* (FIG.. 14 comprising FIGS. 14A, 14B and 14C).—The control console is a plug-in device delivering signals to the logic unit (FIG. 19) on the note side and the interface unit (FIG. 16) on the coin side via the plugs. FIG. 14A shows a typical schematic of a column or group of button keys 12 (FIG. 2) on the control console 10. Referring to FIG. 14B, power is derived from point A. B is the output terminal to the logic unit (FIG. 19) on the note side and the interface unit (FIG. 16) on the coin side and C is earth or ground. Positioning of switch (FIG. 14C and 16 on FIG. 2) to AA, enables the payout of the minimum number of notes for a given pay group. Positioning of the switch to BB enables the payout of the maximum number of notes for a given pay group. In the present case, the payout is arranged for two standard paybreaks within the machine's pay-out capacity. Referring to the button key schematic FIG. 14B, the operation is as follows—

Depress the contact. The contact which is insulated for protection, and engraved for identification is energised on depressing. The input voltage from the fault protection unit (FIG. 15) at A energises the holding solenoid mounted on the button key of which the contact is part. The contact, and hence the button key, is held by the holding solenoid. The output at B supplies signals to the diode logic unit on the note side (FIG. 19) and the transistors within the interface unit on the coin side (FIG. 16).

The resetting of the contact is effected by the interruption of the supply input at A to the holding solenoid (FIG. 14B).

The motor bar, manual cancel, and total button keys are operated in a similar manner to the operation as hereinabove set forth with the holding solenoid disconnected. On energising these contacts momentarily, the outgoing signals are forwarded to—

(a) In the case of the motor bar, the fault protection unit (FIG. 15).

(b) In the case of the manual cancel, the fault protection unit (FIG. 15) and the interface unit (FIG. 16) together with the adding machine operating unit (FIG. 32) via the fault protection unit (FIG. 15) and (c) In the case of the total button key, the adding machine operating unit (FIG. 32) via the fault protection unit (FIG. 15).

*The fault protection unit* (FIG. 15).—The fault protection unit is constructed of relays A1/1 to A10/1, Zener diodes ZD1 to ZD5 and associated resistors as shown on FIG. 15.

When the unit is reset, the Zener diodes ZD1 to ZD5 conduct through the series resistors R1, R6; R2, R7; R3, R8; R4, R9; R5, R10; and the relays A1/1 to A5/1 maintaining relays A1/1 to A5/1 energised and contacts A1/2 to A5/2 closed.

In the event of two or more buttons 12 (FIG. 2) on the console 10 being depressed within a digital column or group, the associated Zener diode drops out of conduction. Considering one such column or group of buttons, that is, the column or group of buttons including Zener diode ZD1, and depressing two or more button keys in that column or group results in—

(a) A double current drain through R1,
(b) A high voltage drop across R1,
(c) The Zener diode ZD1 dropping out of conduction,
(d) The relay A1/1 de-energising,
(e) The power withdrawal from the button keys concerned by the de-energising of relay A1/1 since contact A1/2 opens resulting in,
(f) The closing of contact A1/4, and
(g) The energising of warning lamp 17 (FIG. 2) on the control console 10.

To reset the fault protection unit relays and control console in preparation for the repeat pay command, the cancel button 13 is depressed on the control console 10 resulting in—

(1) The energising of relays A6/1 and A7/1;
(2) The closing of contact A6/7 to energise the cancel solenoid on the adding machine operating unit (FIG. 32 and 18 on FIG. 2);
(3) The opening of the contacts A6/2 to A6/6 to cancel all readings held within the control console 10;
(4) The closing of contacts A7/2 to A7/6 to energise relays A1/1 to A5/1; thus
(5) Closing contacts A1/2 to A5/2 thus re-instating the non conducting Zener diodes into a condition of conduction; and
(6) Opening contacts A1/4 to A5/4 to withdraw the power from the warning lamp 17 on the control console 10.

The payroll information is fed to the machine from the control console. The console resetting is effected upon the release of the notes by interrupting the cancel light beam 139a (FIG. 3) which is part of the cancel light beam photosensor unit (FIG. 26). The cancel light beam photosensor unit emits a pulse to transistor T1 which energises relay A10/1 opening contacts A10/2 to A10/6 resulting in the withdrawal of power from the button keys 12 on the control console 10 thus resetting the console in preparation for the next pay group setting.

The adding machine motor bar solenoid is energised from a pulse leaving the fault protection unit. On depressing the console motor bar 14 (FIG. 2), relay A8/1 is energised for sufficient duration to latch relay A9/1. The pulsing of relay A8/1 closes contact A8/3 momentarily, connecting power to the adding machine operating unit amount solenoid driving transistors (T73 and T74), hence energising the amount solenoids according to the input signals received from the logic unit (FIG. 19) on the note side, and the control console (FIG. 2) on the coin side.

Latching the relay A9/1 also supplies power via contact A9/3 to the collectors of the amplifier transistors (T40 to T42) of the denomination routing unit (FIG. 20). There are eighteen such amplifiers in the denomination routing unit.

As the counter light beam 139, which is part of the counter light beam photo sensor unit (FIG. 24) is interrupted, a signal is received by the adding machine operating unit motor bar solenoid from the interface unit (FIG. 16) via the fault protection unit. To ensure this action, relay A9/1 must be energised. In this instance, the fault protection unit is being utilised as a safety device to ensure that all circuits are complete and hence errorproof.

The fault protection unit provides the pulse for the total button solenoid on the adding machine operating unit (FIG. 32) via 25E on FIG. 15. Once again, the fault protection unit is being utilised as a safety device to ensure that all circuits are complete and hence errorproof.

The following tabulation refers to the numbered input lines and outgoing channels on FIG. 15.

1E to 5E—Supply of power to digital columns or groups of button keys 12 (FIG. 2) on the control console 10.
6E—Supply of power to the cancel solenoid and motor bar solenoid on the adding machine operating unit (FIG. 32).
7E—Return of power from the cancel solenoid on the adding machine operating unit (FIG. 32).
8E—Return of power from the console cancel button 13 (FIG. 2).
9E—Supply of power to the console cancel button 13 FIG. 2).
10E—Earth or ground via relay contacts B5/2 at the interface unit (FIG. 16).
11E—Supplies pulse to the adding machine operating unit (FIG. 32) amount key solenoid drive unit transistors T73 and T74.
12E—Supply of power to contact B3/2 at the interface unit (FIG. 16).
13E—Return pulse from the cancel light beam photosensor unit (FIG. 26) entering transistor T1 operating relay A10/1 in the fault protection unit (FIG. 15).
14E—Earth or ground.
15E—Supply of power to warning lamp 17 (FIG. 2) on console 10.
16E—Supply of stabilised voltage to motor bar 14 on console 10 (FIG. 2).
17E—Return from console motor bar 14.
18E—Return of power from motor bar solenoid on the adding machine operating unit (FIG. 32).
19E—Input from the interface unit (FIG. 16) to the collector of transistor T1 and hence relay A10/1 in the fault protection unit (FIG. 15).
20E—Supply of power to the denomination routing unit amplifiers (FIG.20), the interface unit (FIG. 16), the emitter follows T32 to T39 at the coin selection unit and the note selection station (FIG. 22).
21E—Return of power from the warning lamp 17 (FIG. 2) on console 10.
22E—Output of 12 volt AC.
23E—Input of 12 volt AC.
24E—Stabilised D.C. supply input (FIG. 30).
25E—Supply of power to total button solenoid on the adding machine operating unit (FIG. 32).

The input lines and outgoing channels referred to in the above tabulation terminate at a plug and socket unit arrangement. The female plug is also utilised as a contact arrangement for the distribution of power and signals to other components within the pay machine.

*The interface unit* (FIG. 16).—The interface unit functions to—

(a) Control the coin dispenser;
(b) Control the adding machine motor bar operation;

(c) Control the cancellation of the control console setting.

As the coin button keys on the console 10 (FIG. 2) are depressed, power is supplied to the corresponding transistor bases T2 to T19 in the interface unit.

Operation of the control console motor bar 14 supplies power to the "gate" transistor T20 governing the input of power for the relays B1/1, B2/1, B3/1, B4/1, B5/1 and A10/1 in the fault protection unit. The input of power for these relays B1/1 to B5/1 and A10/1 in the fault protection unit is governed by the input pulses received from the initiating light beam photosensor unit (FIG. 21 and 133 FIG. 4) at 26E, the counter light beam photosensor unit (FIG. 24 and 136 FIG. 4) at 27E and the cancel light beam photosensor unit (FIG. 26 and 137 FIG. 4) at 28E on the note side on interruption of the light beams 134, 139 and 139a (FIG. 3) by the pickers 30.

Simultaneously the input of power for these relays B1/1 to B5/1 and A10/1 in the fault protection unit governs the input of power to the coin selection unit (FIG. 17 and FIG. 18) power transistors T32 to T39, relays C1/1 to C7/1, and finally the operating solenoids of the electro-mechanical coin dispenser (block J hereinabove described).

The initiating light beam photo sensor unit (FIG. 21) feeds a pulse to transistor T21. T21 pulses transistor T20 causing relay B1/1 to energise closing contacts B1/2 and B1/3 and latching relay B1/1 via contacts B5/3. Simultaneously, the amplifying transistors T22 and T23 pulse transistor T24 energising relay B2/1 and closing contact B2/2 thus latching to supply of power derived from 20E at the fault protection unit (FIG. 15) and supplying power to transistors T2 to T19. The coin button keys depressed on the console 10 (FIG. 2) set up the appropriate relays in the group B6/1 to B23/1 and energise the corresponding closing contacts B6/2 to B23/2. Power is also supplied to the collector of transistor T29.

The interruption of the counter light beam 139 being part of the counter light beam photosensor unit (FIG. 24 and 136 on FIG. 4) causes the supply of an input pulse to transistor T26 energising relay B3/1 via transistor T25 closing contact B3/2 momentarily causing the adding machine motor bar solenoid to energise thus recording the amount being dispensed on the adding machine output tape. This energising action of the adding machine motor bar solenoid is of short duration allowing the adding machine to operate in accordance with its inherent design.

On interrupting the counter light beam 139, a pulse is simultaneously transmitted from the amplifying transistors T27 and T28 to the base of transistor T29. Upon transistor T29 receiving this pulse, relay B4/1 energises causing contacts B4/2 and B4/3 to close, supplying a power input to the coin selection unit (FIG. 17) which subsequently energises the coin dispenser operating solenoids.

The closure of contact B4/2 also supplies power to the collector of the console cancel transistor T1 in the fault protection unit.

The interruption of the cancel light beam 139a (FIG. 3) being part of the cancel light beam photosensor unit (FIG. 26 and 137 on FIG. 4) causes the supply of an input pulse to the transistors T30 and T31, energising relay B5/1 and opening contacts B5/2 and B5/3.

The opening of contact B5/3 de-energises the latched relay B1/1 causing contacts B1/2 and B1/3 to open, withdrawing power from transistors T24, T25, T29 and T31 resulting in the resetting of the interface unit, and the de-energising of relay A9/1 in the fault protection unit (FIG. 15) via contact B5/2. The deenergising of relay A9/1 results in the resetting of the fault protection unit (FIG. 15) in preparation for the next pay group setting.

The depressing of the manual cancel button 13 (FIG. 2) at the console 10, results in the energising of relays A6/1 and A7/1 in the fault protection unit. Energising relays A6/1 and A7/1 causes relay B5/1 to be energised via diode D1, limiting resistor and transistor T31 thus resetting the interface unit. Although there should be no resetting of the interface unit necessary since no action has taken effect at this stage, the resetting of the interface unit per relay B5/1 ensures that the unit is in readiness to receive the repeat command.

*The coin selection unit and means of selecting denomination groups.* (FIGS. 17 and 18).—A command is transmitted from the control console buttons on the coin side to transistors T2 and T19 at the interface unit (FIG. 16). The output pulses from these transistors T2 to T19 are forwarded to the corresponding interface relays B6/1 to B23/1 which control contacts B6/2 to B23/2 supplying the input signals to the coin selection unit or logic unit on the coin side (FIG. 17).

The input circuitry is similar to the logic unit (FIG. 19) on the note side hereinafter described. In this case, however, no denomination routing unit is utilised and the diodes drive eight emitter followers T32 to T39 (FIG. 17). These emitter followers T32 to T39 drive eight relays C1/1 to C8/1, that is, one per coin magazine 101 (FIG. 9). It should be noted that nine magazines appear on FIG. 9, however, one of these magazines is not in use and not connected to the circuitry.

The eight coin magazines 101 are utilised as follows—

| | |
|---|---|
| 1 cent | One chute |
| 2 cents | Two chutes |
| 5 cents | One chute |
| 10 cents | One chute |
| 20 cents | Three chutes [1] |

[1] One chute×20 cents; two chutes 2×20 cents=40 cents.

The coin selection arrangement can, of course, be varied to suit any other requirement or to suit any other coin dispensing unit.

Power supply for the emitter followers T32 to T39 is derived from 20E at the fault protection unit (FIG. 15) via the interface unit (FIG. 16).

Energising, say, relay C1/1 (FIG. 17) closes contact C1/2 (FIG. 18) resulting in the energising of the coin selection operating solenoid corresponding to the 1 cent magazine.

Simultaneously, the A.C. voltage appearing across the operating solenoid is rectified, smoothed and the counter corresponding to contact C1/2 energises and forwards one count.

The coin selection unit is reset from the station cancel unit shown on FIG. 26 via the interface unit (FIG. 16).

*Note selection unit and means of selecting preferred denomination group.* (FIGS. 19 and 20.)—The note selection unit is comprised of—

(a) A logic unit (FIG. 19).

(b) A denomination routing unit (FIG. 20).

The logic unit (FIG. 19) comprises a "memory" of diodes. These may be set to pay out a given denomination grouping allowing a minimum or maximum number of notes for a given pay group. These diodes logically rearrange the stored information at the console and transfer the resulting signals to the denomination routing unit (FIG. 20). The denomination routing unit comprises one logic output distribution means per note station. Simultaneously the resulting pulses from the logic unit diodes are transferred to the adding machine solenoid drive unit electronics shown on FIG. 32.

Input to the logic unit (FIG. 19) is derived from the corresponding keys at the control console 10 (FIG. 2) on the note side.

For an example of the logic unit operation, consider an input at point 41 E. Diodes D6, D7 and D8 are forward biassed, and conduct. Diodes D2 to D5 are reversed biassed and stop any voltages appearing across the holding solenoids (FIG. 14b) of the control console keys 12 (FIG. 2) connected to points 38E, 39E and 40E (FIG. 19).

Hence any combination of notes can be arranged by rearranging the diode interconnection. Therefore, the pay group paybreak may be fixed.

The denomination routing unit (FIG. 20) compiles the information received from the logic unit (FIG. 19) on eighteen logic output distribution units 42E to 59E, that is, one per note station hereinabove referred to.

The diodes of the logic unit (FIG. 19) are all connected to their relative logic output distribution means (42E to 59%) in the denomination routing unit (FIG. 20).

There is one amplifier connected to each of the logic output distribution means (42E to 59E) as shown on FIG. 20.

The logic output distribution means (42E to 59E) in the denomination routing unit receive their input pulses from the diodes in the logic unit (FIG. 19). This input potential is applied to the input of transistor T40. VCC for the amplifier (FIG. 20A) is derived from 20E at the fault protection unit (FIG. 15).

Depressing the motor bar 14 (FIG. 2) of the control console 10 energizes relay A9/1 in the fault protection unit closing contact A9/3 and supplying power to the amplifier (FIG. 20A) via 20E at the fault protection unit (FIG. 15).

On receiving power from the fault protection unit, the input to transistor T40 drives transistor T40 into saturation. VBE is a maximum, and VCE tends to zero. VCE.T41 increases to VCC, and T42, being an emitter follower, yields this at its output minus VBE.T42.

The machine at present described proposes utilizing eighteen note selection stations and hence eighteen logic output distribution means (42E to 59E). However, the present arrangement can, of course, be varied to suit any other requirement.

The description of the Summing Device is now continued.

*The initiating light beam photo sensor unit (FIG. 21).*—One light beam photosensor unit 133 (FIG. 4) to energize any or all pickers 30 as signalled by the denomination routing unit is continuously triggered by the motion of the picker 30 through an initiating light beam provided by a lamp or other suitable light source 134 (FIG. 3). The light interference pulse is detected by the photo sensor 135, amplified, and passed to the coincidence initiating unit shown on FIG. 22.

The initiating light beam photosensor unit consists of—

(1) An inversely biassed photosensor.
(2) An emitter follower T43 driving.
(3) An inverter amplifier T44 driving.
(4) A Darlington pair T45, T46 which drives.
(5) The bases of all eighteen initiating transistors.

T47 in the coincidence initiating units shown on FIG. 22. There is one such initiating transistor T47 in each coincidence initiating unit. There are eighteen coincidence initiating units, that is one per note selection station shown on FIG. 22.

Constant illumination causes an increased current through the photosensor, shown on FIG. 21, providing an output at the tapped emitter resistors. The tapped emitter resistors are shown as 18K ohm and 15.6K ohm.

The inverter amplifier T44 is driven into saturation and therefore VCE is at saturation level. This driving condition has no effect on the Darlington pair T45, T46 and no output appears across the emitter resistor of T46.

As the picker 30 (FIG. 4) interrupts the light beam 134 (FIG. 3), the photosensor 135 is completely biassed off and no input to the inverter amplifier T44 results, raising VCE to—VCC. The raising of VCE to —VCC causes the Darlington Pair T45, T46 to follow up with an output of VCC minus ($VBE . T45$ plus $VBE . T46$).

The output of VCC minus ($VBE . T45$ plus $VBE . T46$) is fed into the bases of the initiating transistors T47 in the coincidence initiating units shown on FIG. 22. There are eighteen coincidence initiating units identical to that shown on FIG. 22 there being one for each note selection station (FIG. 22). The pulses received simultaneously from the denomination routing unit (FIG. 20) and the coincidence initiating unit shown on FIG. 22 result in the energizing of the corresponding note selection station relay D1/1. The signals received from the denomination routing unit (FIG. 20) are only from the appropriate logic output distribution means (42E to 59E) feeding the corresponding note selection station (FIG. 22) as determined by the logic unit (FIG. 19) after receipt of a signal or signals from the console 10 (FIG. 2).

A pulse from the initiating light beam photo sensor unit is also forwarded to the interface unit (FIG. 16) at 26E, the result of which is hereinabove referred to.

*The note selection station (FIG. 22).*—A note selection station operating unit consists of three relays D1/1, D2/1 and D3/1 hereinabove referred to as Relay I, Relay II and Relay III respectively. There are eighteen stations as previously stated.

As the control console motor bar 14 (FIG. 2) is depressed, power is supplied at 20E of the fault protection unit (FIG. 15), forwarded to the power amplifiers of the denomination routing unit (FIG. 20), and hence to the collector of transistor T47 which makes up the coincidence initiating unit. A pulse of negative polarity is supplied to the base of transistor T47 from the initiating light beam photo sensor unit (FIG. 21), when the picker is in its picking position, by interruption of the initiating light beam 134 (FIG. 3). Hence transistor T47 acts as a coincidence gate.

Upon supplying a pulse of negative polarity to the base of transistor T47 relay D1/1 energises closing contact D1/3 thus maintaining relay D1/1 energised through the 220 ohm resistor. Contact D1/2 closes and the picker solenoid 42 (FIG. 4) is energised through the normally closed switch contact SW1/1. Throughout this description, the contacts only of the switch 131 (FIG. 3) will be referred to. The contacts concerned are contacts SW1/1 to SW1/3.

Energising relay D1/1 closes the picker jaws 41 (FIG. 5) since the switch contact SW1/1 is closed.

In the event of no note being present, the metallic surfaces of the picker jaws 41a and 41b make contact and the relay D2/1 circuit is complete. Energising relay D2/1 closes contact D2/2 and, through contact D1/4 which closed when relay D1/1 became energised, relay D3/1 energises.

The energising of relay D3/1 causes contact D3/2 to close and since contact D2/3 is opened on energising relay D2/1, the motion of the picker 30 and collating chain 63 is stopped by the de-energising of the motor contactor CO3 (FIG. 34). The energising of relay D3/1 causes contact D3/4 to illuminate the failure and error indicator lamp L1 (and 130 FIG. 3) indicating the faulty note selection station (FIG. 22). There are eighteen note selection stations as previously stated.

Correction of the fault may be achieved by switching contact SW1/1 open. Opening contact SW1/1 causes the picker solenoid 42 to de-energise and the picker jaws 41 to open. Simultaneously with the opening of switch contact SW1/1, the relay D2/1 de-energises, de-energising relay D3/1, causing contacts D3/2 and D3/4 to open, and the lamp L1 extinguishes. While the switch contact SW1/1 is in the open condition, the drive motor contactor CO3 (FIG. 34) cannot be energised since switch contact SW1/3 is also open. Upon correction of the fault, switch contact SW1/1 is returned to the closed position closing contact D3/3 thus enabling the machine to be restarted.

On returning switch contact SW1/1 to its operational position, the pickers 30 and collating chain 63 may be set in motion again by energising contactor CO3 (FIG. 34). Contractor CO3 (FIG. 34) is energised by depressing the motor start button 15*b* on the control panel 15 (FIG. 2).

Relay D3/1 is also governed by the note accuracy test unit (FIG. 23), the function of which is hereinafter referred to.

The energising of relay D3/1 by the note accuracy test unit (FIG. 23) causes contact D3/2 to close thus latching relay D3/1 to the stabilised power supply (FIG. 30). The energising of relay D3/1 also opens contact D3/3 and the motor contactor CO3 (FIG. 34) is de-energised and the machine stopped. Simultaneously, the energising of relay D3/1 closes contact D3/4 causing the failure and error indicator lamp L1 to illuminate.

Switching contact SW1/1 open allows the fault to be corrected and the machine to be reset as hereinabove described.

Each note selection station is similarly equipped. All the normally closed contacts, operated by the note accuracy test unit relay D3/1, are connected in series so that should any one of the eighteen note selection stations be effected, the machine drive contactor CO3 (FIG. 34) will de-energise and the machine motions will stop.

The energising of relay D1/1 latches contact D1/3 to the stabilised power supply (FIG. 30). This latching action supplies power to the collectors of the counter drive transistors T58 to T63 in the coincidence counting unit (FIG. 25).

The station cancel unit also shown on FIG. 22 consists of a transistor T48 and associated 5.6K ohm transistor T48 base resistor. This unit is connected across the coil of relay D1/1. The transistor T48 collector load is formed by the 220 ohm series resistor. Upon the picker 30 interrupting the cancel light beam 139*a* (FIG. 3) being part of the cancel light beam photosensor unit (137 FIG. 4 and FIG. 26) causes the supply of a pulse to the bases of transistors T64 and T65 (FIG. 26). The driving of transistors T64 and T65 provides a pulse to transistor T48 (FIG. 22). Transistor T48 in receipt of this pulse saturates and shunts relay D1/1. Full supply voltage appears across the 220 ohm resistor and relay D1/1 de-energises. This de-energising action of relay D1/1 resets the corresponding contacts D1/2 to D1/4 opening the picker jaws 41 and disconnecting the counter driving transistors T58 to T63 supply.

Cancel pulses are supplied regardless of whether the relays D1/1 are energised or not. These cancelling pulses ensure that all note selection stations are reset.

*The note accuracy test unit (FIG. 23)*.—The accuracy of the note transfer from the bulk note storage boxes 22 (FIG. 3) to the cradles 60 mounted on the collating track 61 is examined by the note accuracy test unit (FIG. 23 and 120 on FIG. 4) which is operative at all times. There is one plug-in note accuracy test unit 120 fitted for and situated adjacent to each of the note transfer stations within the path to be taken by the note in being transferred from a bulk storage box 22 to the corresponding cradle 60 mounted on the collating track 61.

The note accuracy test unit consists essentially of the following—

(1) A light source 121 (FIG. 4) and photosensor 122, also shown in FIG. 23.

(2) Photo sensor output unit.

(3) Schmitt trigger.

(4) Power output drive to relay D3/1 (FIG. 22).

A reverse biassed photo sensor 122 (FIG. 4) illuminated by a light source 121 causes a voltage drop across R11 resulting in a very low output from the emitter follower T49.

Removal of the illumination, drastic reduction as in the case of a light source lamp failure, the presence of two or more notes or the presence of other foreign material, yields an output from the emitter follower T49 large enough to cause the Schmitt trigger to emit a pulse.

As transistor T50 is normally on, that is under normal illumination conditions, no output is supplied to the power output stage, except for the bias present across R12. The relay D3/1 in the note selection station (FIG. 22) is therefore not energised since this bias is not high enough to drive the Darlington pair T51, T52. On emission of a pulse from the Schmitt trigger, relay D3/1 will be driven into an energised condition by the Darlington pair T51, T52.

The energising of relay D3/1 by the note accuracy test unit (FIG. 23) causes contact D3/2 to close thus latching relay D3/1 to the stabilised power supply (FIG. 30). The energising of relay D3/1 also opens contact D3/3 and the motor contactor CO3 (FIG. 34) is de-energised and the machine stopped. Simultaneously the energising of relay D3/1 closes contact D3/4 causing the failure and error indicator lamp L1 (FIG. 22) to illuminate.

Switching contact SW1/1 (FIG. 22) open allows the fault to be corrected and the machine to be reset as hereinabove described.

All the normally closed contacts operated by the note accuracy test unit relay D3/1 are connected in series so that should any one of the eighteen note selection stations be effected, the machine drive contactor CO3 (FIG. 34) will de-energise and the machine motions will stop.

The practical execution of this note accuracy test unit 120 provides a cylindrical box into which the circuit components are mounted on matrix board. The lens and photosensor are mounted in the tube emanating from this cylindrical box in a suitable holder. The photosensor position may be varied so as to position it to the lens focal length requirement. The cylindrical box may be plugged into a suitable socket situated in frame 20 (FIG. 4) as hereinabove stated.

*The counter light beam photo sensor unit (FIG. 24) and including the coincidence counting unit (FIG. 25)*.—All note selection stations are fitted with a counter situated on panel 19 (FIG. 2). The count is registered by a method similar to the coincidence initiating unit utilising a light beam photosensor unit shown on FIG. 24 and 136 on FIG. 4 comprising a housing containing a light source 139 (FIG. 3) and photo sensor unit 139*b*, amplifier pulse unit and coincidence counting unit shown on FIG. 25.

The photosensor of the counter light beam photosensor unit (FIG. 24) is constantly illuminated by a light source causing a voltage drop across its load large enough not to give an output from the Darlington pair T53, T54.

When the light beam 139 is interrupted by the motion of the pickers 30, this voltage drop across the load referred to in the previous sentence, becomes so small that an output pulse results from the Darlington pair T53, T54. This pulse emits every time the light beam 139 is interrupted whether or not a note is being transferred from the bulk note storage box 22 to the cradle 60 mounted on the collating track 61.

The output pulse from the Darlington pair T53, T54 in the counter light beam photo sensor unit (FIG. 24) drives the three emitter followers T55 to T57 (FIG. 25), each of which drives a group of six transistors T58 to T63 as typically shown on FIG. 25. These transistors T58 to T63 operate as coincidence gates forming part of the coincidence counting unit (FIG. 25) comprising the three emitter followers T55 to T57 and the coincidence gates T58 to T63. There are eighteen such counters on the note side of which six are shown in FIG. 25.

The collector supply for these transistors T58 to T63 is derived from each of the corresponding note selection stations (FIG. 22). The energising of relay D1/1 within the note selection station (FIG. 22) latches contact D1/3 to the stabilised power supply (FIG. 30). This latching action supplies power to the collectors of the counter driving transistors hereinabove referred to as T58 to T63 in the coincidence counting unit (FIG. 25).

The corresponding counter will thus be forwarded one count when a pulse is supplied to the counter drive transistor base (typical T58 to T63) from the counter light beam photo sensor unit (FIG. 24) when the collector supply is present. This count takes place between the interrupting of the initiating light beam photosensor unit (FIG. 21) and the station cancel light beam photosensor unit (FIG. 26). The cancel light beam photosensor unit is dealt with in detail hereinafter.

When the counter light beam 139 (FIG. 3) is interrupted by the motion of picker 30 as hereinabove referred to, a pulse is transmitted from the Darlington pair T53, T54 (FIG. 24) to the interface unit (FIG. 16) at 27E. Relay B4/1 in the interface unit (FIG. 16) is energised, and a signal is sent to the coin selection unit (FIG. 17). Simultaneously a pulse is transmitted from the interface unit (FIG. 16) via the fault protection unit (FIG. 15) to the adding machine operating unit motor bar solenoid referred to in FIG. 32.

*Cancel light beam photosensor unit (FIG. 26) and including the station cancel unit shown on FIG. 32.*—The cancel light beam photosensor unit 137 (FIG. 4) is interrupted by the path of the picker 30 through the light beam 139a (FIG. 3). The photosensor (FIG. 26 and 138 FIG. 3) is constantly illuminated by the light source 139a. As the light beam is interrupted the voltage drop across the photosensor load (FIG. 26) is reduced, and the Darlington pair T64, T65 yields an output which is fed to the bases of cancel transistors T48 constituting the eighteen station cancel units. One such station cancel unit is shown on FIG. 22.

The interruption of the cancel light beam 139a (FIG. 3) being part of the cancel light beam photosensor unit (FIG. 26 and 137 on FIG. 4) causes the supply of an input pulse from the Darlington pair T64, T65 (FIG. 26) to the transistors T30 and T31 at the interface unit (FIG. 16), energising relay B5/1 and opening contacts B5/2 and B5/3. The opening of contact B5/3 de-energises the latched relay B1/1 causing contacts B1/2 and B1/3 to open withdrawing power from transistors T24, T25, T29 and T31 resulting in the resetting of the interface unit (FIG. 16) and the de-energising of relay A9/1 in the fault protection unit (FIG. 15) via contact B5/2. The de-energising of relay A9/1 results in the resetting of the fault protection unit (FIG. 15) in preparation for the next pay group setting. The resetting of the control console 10 (FIG. 2) is effected when, upon the de-energising of relay A9/1 in the fault protection unit (FIG. 15), the supply of power at input A to the holding solenoid (FIG. 14b) is interrupted.

The cancel transistor T48 (FIG. 22) which constitutes the station cancel unit is connected across the relay D1/1. The transistor T48 collector load is formed by the 220 ohm series resistor. When relay D1/1 (FIG. 22) is energised, the picker 30 interrupts the cancel light beam 139a (FIG. 3) forming part of the cancel light beam photosensor unit 137 (FIG. 4), a pulse is fed into the bases of transistors T64, T65, forming a Darlington pair. The driving of transistors T64, T65 provides a pulse to transistor T48 (FIG. 22). Transistor T48 in receipt of this pulse, saturates and shunts relay D1/1.

Full supply voltage appears across the 220 ohm resistor and relay D1/1 de-energises. This de-energising action of relay D1/1 resets the corresponding contacts D1/2 to D1/4 opening the picket jaws 41 and disconnecting the counter driving transistors T58 to T63 supply.

Cancel pulses are supplied regardless of whether the relays D1/1 are energised or not. These cancelling pulses ensure that all note selection stations are reset.

*Fail safe device for light source photosensor units (FIG. 27).*—In order to ensure that no errors are introduced due to lamp failure, a light sensitive resistor is included in each lamp L2 to L4 housing not connected with the note accuracy test units (FIG. 23).

These light resistors LS1 to LS3 are all in series and form the bottom part of a voltage divider. Connected to the junction of the R13 resistor and light sensitive resistors LS1 to LS3 is a transistor T66 operating a relay E1/1 with a normally closed contact E1/2 and a normally open contact E1/3.

Should any one of the lamps L2 to L4 fail, the corresponding light resistor, LS1 to LS3, value becomes very large, and the transistor T66 energises the relay E1/1. Consequently contact E1/2 opens, de-energising the drive motor contactor CO3 (FIG. 34). Should failure in this connection occur, the relay E1/1 closes contact E1/3 and illuminates the failure warning lamp 15c (FIG. 2).

On restoring illumination, the light sensitive resistors value reduces to its normal operating level de-energising relay D1/1 causing contact E1/2 to close thus enabling the drive motor to be restarted by energising contactor CO3 (FIG. 34).

*The delay timer (FIG. 28).*—The thermal inertia of the lamps L2 to L4 (FIG. 27) not connected with the note accuracy test units (FIG. 23), makes it essential to delay the supply of power to the fail safe device for the light source photo sensor units (FIG. 27) on energising the power supply contactor CO2 (FIG. 34) on the power distribution board.

Operation of the timer depends on the delay required to charge the capacitor C1 to such a voltage as to cause the Darlington pair T67, T68 to energise relay F1/1 and therefore contact F1/2 to close.

This enables the motor drive switching procedure to continue without a delay occuring due to contactor interruption at the power distribution board (FIG. 34).

*The cabinet interlocking system (FIG. 29).*—A series of microswitches denoted U1 to U12 are situated at positions around the machine frame 20 (FIG. 3) beneath the removable exterior panels sheathing the interior of the machine. The microswitches U1 to U12 are normally closed so that with the panels in position all microswitches U1 to U12 are open.

The removal of any one sheathing panel of the machine cover causes the corresponding microswitch to close and relay G1/1 to energise. The energising of relay G1/1 causes contact G1/2 to open thus withdrawing power from all components by de-energising contactor CO2 at the power distribution board (FIG. 34).

This cabinet interlocking system safeguards everybody present from electrical shock and mechanical entanglement once a sheathing panel is removed.

The cabinet interlocking system by-pass is described hereinafter.

*Power supplies (FIGS. 30 and 31).*—Preferably, the power input to the machine is through a distribution switchboard (FIG. 34) which feeds two power supplies viz.—

(1) Stabilised power supply (FIG. 30).
(2) Unstabilised power supply (FIG. 31).

The stabilised power supply (FIG. 30) is utilised to feed all electronic components. The unstabilised power supply (FIG. 31) is utilised to feed all light sources required for, (a) Note accuracy test units 120 (FIG. 4).
(b) Initiating light beam photosensor unit 133 (FIG. 4).
(c) Counter light beam photosensor unit 136 (FIG. 4).
(d) Cancelling light beam photosensor unit 137 (FIG. 4), and the 12 volts A.C. power required for the failure and error indicator lamps 130 (FIG. 3), the electronics cooling fan shown on FIG. 31, the fault protection unit warning lamp 17 (FIG. 2) on the console 10, the failure warning lamp 15C (FIG. 2), supply of power through the fault protection unit (FIG. 15), the coin dispenser 100 (FIG. 9) and the adding machine operating unit (FIG. 32).

The stabilised power supply (FIG. 30) comprises two bridge rectifiers BR1 and BR2. These bridge rectifiers BR1 and BR2 feed the shunt regulator transistor T69 and the main regulator transistors T70 to T72 supplies respectively. The main series regulator transistors T70 to T72 supply is smoothed via the inductor capacitor filter I.C.F.1., and fed through two power transistors T70 and T71 to the output terminal 60E. Terminal 61E is earth or ground.

The shunt regulator transistor T69 supply is smoothed by the capacitor input filter C.I.F.1, referred to the main output by use of a Zener diode ZD6.

The output voltage under full load is 11.2 volts; no load output is 11.25 volts; and the output ripple at full load is 2.5 millivolts.

The unstabilised power supply (FIG. 31) consists of a full wave rectifier FWR1, FWR2 feeding two bus bars. The adding machine operating unit imprinting device (FIG. 33) is supplied with power for all functioning components including the operating solenoids by a self contained power supply unit, the details of which are deemed unnecessary for the purpose of this specification. All light sources referred to hereinabove are connected to these bars. 62E is the active and 63E is earth or ground.

The no load voltage is 13 volts; full load voltage is 11.5 volts.

*The adding machine operating unit (FIG. 32).*—A conventional full keyboard adding machine 18 (FIG. 2), or similar recording device is connected to the console by the command circuit so as to record a progressive total of the individual amounts paid out for the purpose of balancing, ledger keeping, etc.

A panel of amount solenoids is disposed over the full keyboard adding machine. Included on this panel are the cancel, motor bar and total solenoids required to depress the respective button keys of the adding machine 18 being accessory buttons to the amount solenoids.

Adding machine amount solenoid drive units and the diode logic arrangement of the logic unit (FIG. 19) on the note side are the necessary electronic units required to drive the amount solenoids on the note side.

The input signals to the logic unit (FIG. 19) on the note side are derived from the control console button keys 12 (FIG. 2). The input signals to the adding machine amount solenoid drive units on the note side are derived from the logic unit (FIG. 19) and the signals are received at the bases of transistors T73 and T74.

The input signals to these transistor bases T73 and T74 on the coin side are derived direct from the control console coin button keys.

An adding machine amount key solenoid drive unit (FIG. 32) consists of two transistors T73 and T74 driving an amount solenoid which is connected to the collector of transistor T74. There is one adding machine amount key solenoid drive unit for each button key utilised on the adding machine and the corresponding drive unit amount solenoid is disposed above the corresponding adding machine button key.

Depressing the motor bar 14 (FIG. 2) on the console 10 energises relay A8/1 at the fault protection unit (FIG. 15) for sufficient duration to latch relay A9/1. The pulsing of relay A8/1 closes contact A8/3 momentarily connecting power to the adding machine amount key solenoid drive unit transistor T73 and T74 collectors hence energising the amount solenoids, corresponding to the signals received from the logic unit (FIG. 19) on the note side and the console 10 (FIG. 2) on the coin side, disposed over their corresponding amount button keys on the adding machine 18 (FIG. 2). The collector supply to transistors T73 and T74 is pulsed so that the adding machine amount button keys are depressed or pushed by the amount key solenoid plungers for the duration of this pulse, and the adding machine button keys hold per the adding machine design.

The operating pulses for the motor bar, cancel and total key solenoids disposed above the adding machine keyboard are derived as follows—

*Motor bar.*—From the interface (FIG. 16) via the fault protection unit (FIG. 15) upon the interruption of the counter light beam 139 being part of the counter light beam photosensor unit (FIG. 24). To ensure this action, relay A9/1 must be energised in the fault protection unit (FIG. 15).

*Cancel button key.*—From the interface unit (FIG. 16) on energising relays A6/1 and A7/1 at the fault protection unit.

*Total button key.*—From the control console 10 (FIG. 2) via the fault protection unit (FIG. 15).

The amount is set up on the adding machine per the adding machine design, and final printing onto the adding machine output tape takes place on the energising of the adding machine motor bar solenoid.

*The adding machine operating unit tape imprinting device (FIG. 33).*—As stated previously a conventional full keyboard adding machine 18 (FIG. 2) or similar recording device is connected to the command circuit so as to record a progressive total of the individual amounts paid out for the purposes of balancing, ledger keeping etc.

As also previously stated, a panel of amount solenoids is disposed over the full keyboard adding machine. These solenoids actuate the amount keys, cancel keys, motor bar key, and total key of the adding machine in ordered sequence so as to record the amounts and the progressive totals of the monies being dispensed by the pay machine.

Mounted at the same level as the amount key solenoids over the three left hand columns of keys on the adding machine are a similar group of twenty seven solenoids. The capacity to add has been removed from the button keys within these three columns and their use does not affect the totals being produced on the tape.

The adding machine operating unit tape imprinting device (FIG. 33) which consists of three uniselectors H1 to H3 and three microswitches U13 to U15 is utilised to energise these non-add key solenoids in ordered sequence to imprint the numbers 1 to 999 alongside the amounts being recorded. The object of this unit is to provide the payroll number equivalent to the numbering on the master payroll sheets, input data sheets, cards etc. and the envelope being filled, on the adding machine recording tape to enable accurate quick cross reference. In printing the numbers 1 to 999, a check may be made at any time from the payroll number within the group 1 to 999 on the adding machine output tape and the master payroll sheets which embody the corresponding payroll number.

An electro-mechanical arrangement which enables the microswitches to be operated by the movement of the adding machine tape transporting carriage is utilised to provide the pulses to the coils of the uniselectors H1/1 to H3/1. The uniselectors H1 to H3 finally provide the output pulses to the solenoids operating the non-add keys of the adding machine.

Referring to FIG. 33 the following description enables the tape imprinting device operation to be understood.

On commencing each new payroll, the total button 11 (FIG. 2) on the console 10 is depressed thus totalling the individual amounts recorded from the previous payroll within the adding machine and resetting the tape imprinting device uniselector contacts H1/2 to 11, H2/2 to 11 and H3/2 to 11 to zero. Microswitch U13 performs this imprinting device resetting operation on depressing the total button.

Forwarding the manual grand total bar on the adding machine 18 (FIG. 2) energises the microswitch U14 which in turn energises the uniselector coil H1/1 forwarding uniselector contacts H1/2 to 11 to position 1. The positioning of uniselector contacts H1/2 to 11 to position 1 causes an output pulse from the adding machine key solenoid number 1 in the units column to meet an input supply from the tape imprinting device power supply through the microswitch U15 thus energising this solenoid momentarily. The microswitch U14 followed by microswitch U15 are closed in sequence by the movement of the adding machine tape transporting carriage. This tape transporting carriage performs an oscillatory motion of short duration only when the adding machine tape printing bars are signalled to print.

Energising the adding machine key solenoid number 1 in the units column momentarily causes the corresponding key to depress on the adding machine. This key remains depressed per the adding machine design.

The pay group to be dispensed by the pay machine as set up on the console 10 may be found to be in error. The console cancel button 13 is depressed to reset the console, and simultaneously a pulse is transmitted to the adding machine cancel button as previously described. The cancellation of the tape imprinting key or keys causes the imprint number to be omitted on the resetting and recording of the repeat command.

However should this cancellation action be disregarded and the pay group amount set up be correct, the console motor bar 14 is depressed. This action of depressing the console motor bar energises the pay machine's functions in sequence as described hereinabove.

On the interruption of the counter light beam 139 (FIG. 3) being part of the counter light beam photosensor unit 136 (FIG. 4), after the initiating light beam photosensor unit light source 134 (FIG. 3) has been interrupted, the adding machine motor bar solenoid is energised.

The pay group amount dispensed having been recorded on the output tape of the adding machine allows the depressed keys on the adding machine to reset per the inherent design.

The printing of the output tape by the adding machine tape printing bars causes the tape transporting carriage to perform a further oscillatory motion thus advancing the tape imprinting device uniselectors to the next digit and energising the corresponding key solenoid or solenoids momentarily, the sequence of which is hereinabove described.

It should be noted that on arrival at number 9 in the units column on the output tape, the uniselector H1 returns to zero and simultaneously transmits a signal to uniselector H2. Uniselector H2 governs the operation of the tens column adding machine key solenoids and uniselector contacts H2/2 to 11 forward to position 1, thus causing the number 10 to be imprinted during the following cycle. Similarly uniselector H3 is operated by the forwarding action of uniselector H2.

*The power distribution block diagram (FIG. 34).—* Three phase power supply enters the power distribution board at the main switch MS1 (FIG. 34). On de-energising this switch, the entire machine circuit is isolated from the supply mains.

Following the main switch MS1 is contactor CO1, the energising of which enables the compressor motor and vacuum pump motors to be energised.

Energising contactor CO2 provides power for distribution by the stabilised power supply (FIG. 30) and the unstabilised power supply (FIG. 31).

Switching contactor CO3 sets the drive motor 50 (FIG. 3) in motion. The motor 50 drives the pickers 30 and the collating chain 63 through the bevel gearbox 52.

The sequence of contactor energising is CO1, CO2 and finally CO3 making it impossible to neglect some essential section of the pay machine causing possible incorrect or incomplete pay groups to be dispensed.

In order to trace faults or conduct routine maintenance, the pay machine may be operated without the cabinet sheathing panels in position. To operate the pay machine without the cabinet sheathing panels, a key operated maintenance switch MS2 must be placed in the "on" position. Positioning of the maintenance switch MS2 in the "on" condition by-passes the cabinet interlocking system (FIG. 29) and simultaneously illuminates a large red danger lamp situated above the pay machine to ensure danger lamp visibility and to indicate danger. On the control panel 15 (FIG. 2) handy to the operator there is an emergency stop button 15a which de-energises the contactor CO1 and hence the entire machine.

The contactors CO1 to CO3 are protected by thermal overload switches and fuses.

From the foregoing, it will be seen that the entire pay machine has been devised in such a manner as to ensure that the operation will be completely reliable and "error-proof" with rectification of failure accomplished simply and safely. As far as possible, component groups have been arranged to be readily extracted and replaced by standby equipment ensuring continuity of operation.

I claim:

1. A money dispensing machine comprising in combination,
   command means including data input means,
   summing means operatively connected to said command means,
   said data input means controlling said command means to provide a signal to said summing means which is representative of a selection of monetary elements to be paid out,
   said summing means including note dispensing means having a plurality of note storage boxes each storing notes of a respective denomination, note transfer means including a picker arm for each note storage box, means responsive to said signal for selectively controlling said picker arms to intermittently enter selected ones of said note storage boxes to transfer selected notes in accordance with the sum to be paid out, and a respective cradle for each picker arm for receiving the notes selected from said note storage boxes b ythe associahted picker arm,
   an assembly station,
   and means for at times collating the notes stored in the plurality of cradles and delivering the collated notes to said assembly station.

2. The machine is claim edin claim 1 which further includes a coin dispenser and means responsive to said signal for actuating said coin dispenser to dispense to said assembly station a selection of coins in accordance with the sum to be paid out.

3. A pay machine according to claim 1, wherein said note transfer means also includes a vertically reciprocating lifting plate supporting at least one suction cup disposed above each said box for attaching a note upon contact with the stack, said endless conveyor continuously moving over a fixed collating track and having projecting fingers that pass through said cradles to collect the notes deposited therein.

4. A pay machine according to claim 1, wherein the data input means is operatively connected with a fault protection unit including means for cancelling input errors, said note selection unit comprising means including a logic unit and a denomination routing unit for selecting preferred denomination groups of notes, said coin selection unit comprising means for selecting denomination groups of coins including a logic unit, and said interface unit being interconnected with a fault protection unit and said coin selection unit.

5. A pay machine according to claim 4 wherein said data input means includes a control console having manually operable push buttons, said console including a switch which when actuated delivers signals to the logic unit for dispensing notes and to the interface unit for dispensing coins, means responsive to said switch in one position for providing a payment of the minimum number of notes for a given pay group and responsive to said switch in the other position for providing the maximum number of notes for a given pay group.

6. A pay machine according to claim 5, including an adding machine operatively connected with said data input means.

7. A pay machine according to claim 6, wherein said fault protection unit controls the distribution of energy to elements of said command device and said summing device, said fault protection unit in response to the erroneous multiple entry of information to the same column or group of button keys on the console supplying energy from the fault protection unit to a warning lamp in the instance of error, and rendering said command device and said summing device inoperable.

References Cited

UNITED STATES PATENTS

| | | | |
|---|---|---|---|
| 1,870,554 | 8/1932 | Burdick | 133—4 |
| 2,805,675 | 9/1957 | Noyes | 133—4 |
| 2,910,991 | 11/1959 | Quinn et al. | 133—2 |
| 3,099,274 | 7/1963 | Fitzsimons | 133—4 |
| 3,123,082 | 3/1964 | Call et al. | 133—4 |
| 3,308,914 | 3/1967 | Lake | 133—2 X |

SAMUEL F. COLEMAN, Primary Examiner